United States Patent [19]

Tomono et al.

[11] Patent Number: 5,818,954
[45] Date of Patent: Oct. 6, 1998

[54] METHOD OF DETECTING EYE FIXATION USING IMAGE PROCESSING

[75] Inventors: Akira Tomono; Muneo Iida; Kazunori Ohmura, all of Kyoto, Japan

[73] Assignee: ATR Communication Systems Research Laboratories, Kyoto, Japan

[21] Appl. No.: 661,367

[22] Filed: Feb. 27, 1991

Related U.S. Application Data

[62] Division of Ser. No. 378,626, Jul. 12, 1989, Pat. No. 5,016,282.

[30] Foreign Application Priority Data

| Jul. 14, 1988 | [JP] | Japan | 63-175899 |
| Aug. 3, 1988 | [JP] | Japan | 63-193898 |
| Aug. 19, 1988 | [JP] | Japan | 63-193899 |
| Nov. 16, 1988 | [JP] | Japan | 63-289761 |

[51] Int. Cl.⁶ ............................................. G06K 9/00
[52] U.S. Cl. ................................................. 382/115
[58] Field of Search .......................... 382/6, 61, 2, 68, 382/5

[56] References Cited

U.S. PATENT DOCUMENTS

| 3,689,135 | 9/1972 | Young et al. | 351/1 |
| 4,075,657 | 2/1978 | Weinblatt | 358/93 |
| 4,102,564 | 7/1978 | Michael | 351/7 |
| 4,145,122 | 3/1979 | Rinard et al. | 351/39 |
| 4,303,394 | 12/1981 | Berke et al. | 434/40 |
| 4,641,349 | 2/1987 | Flom et al. | 382/2 |
| 4,651,145 | 3/1987 | Sutter | 340/706 |
| 4,702,575 | 10/1987 | Breglia | 351/210 |
| 4,755,045 | 7/1988 | Borah et al. | 351/210 |
| 4,975,969 | 12/1990 | Tal | 382/2 |
| 5,008,946 | 4/1991 | Ado | 382/2 |

FOREIGN PATENT DOCUMENTS

| 58-213382 | 12/1983 | Japan . | |
| 61-041906 | 2/1986 | Japan | G01B 11/24 |

OTHER PUBLICATIONS

Database Inspec. Institute of Electrical Engineers, Stevenage, GB Inspec. No. 2894070, T. Ishii et al., "An application of image processing to human interface for automobile driver" *abstract* and Transaction of the Society of Instrument and Control Engineers, vol. 22, No. 11, Nov. 1986, Japan, pp. 1183–1188.

NTZ ARCHIV, vol. 8, No. 10, Oct. 1986, Berlin De, pp. 245–256, R. Buhr "Analyse and Klassifikation von Gesichtsbildern".

SPIE—The International Society for Optical Engineering, vol. 1194 Optics, Illumination, and Image Sensing Machine Vision IV (1989).

*Primary Examiner*—Jose L. Couso
*Attorney, Agent, or Firm*—Lowe, Price, LeBlanc & Becker

[57] ABSTRACT

The inventive method calculates a position of the center of the eyeball as a fixed displacement from an origin of a facial coordinate system established by detection of three points on the face, and computes a vector therefrom to the center of the pupil. The vector and the detected position of the pupil are used to determine the visual axis.

12 Claims, 21 Drawing Sheets

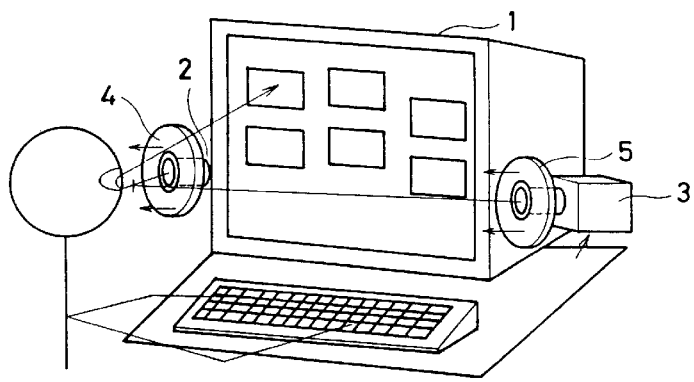
FIG. 1 PRIOR ART
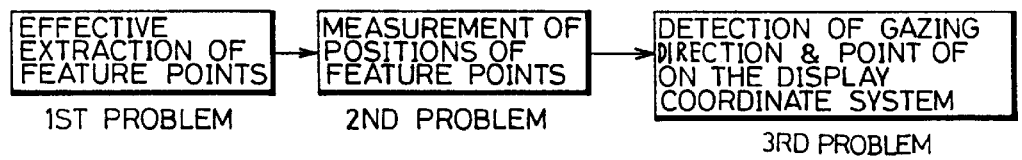
| EFFECTIVE EXTRACTION OF FEATURE POINTS | MEASUREMENT OF POSITIONS OF FEATURE POINTS | DETECTION OF GAZING DIRECTION & POINT OF ON THE DISPLAY COORDINATE SYSTEM |
|---|---|---|
| 1ST PROBLEM | 2ND PROBLEM | 3RD PROBLEM |
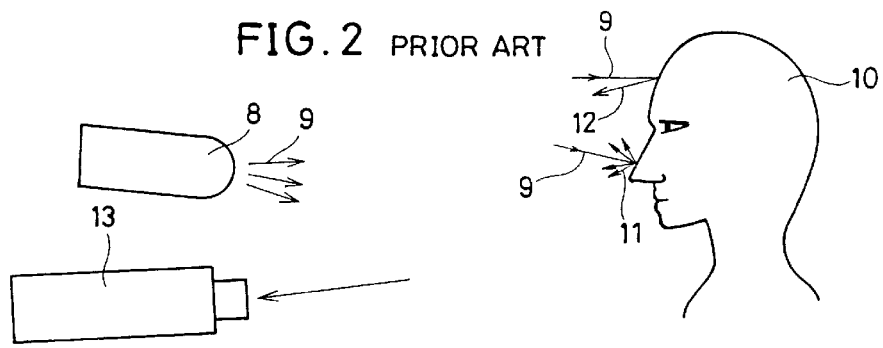
FIG. 2 PRIOR ART
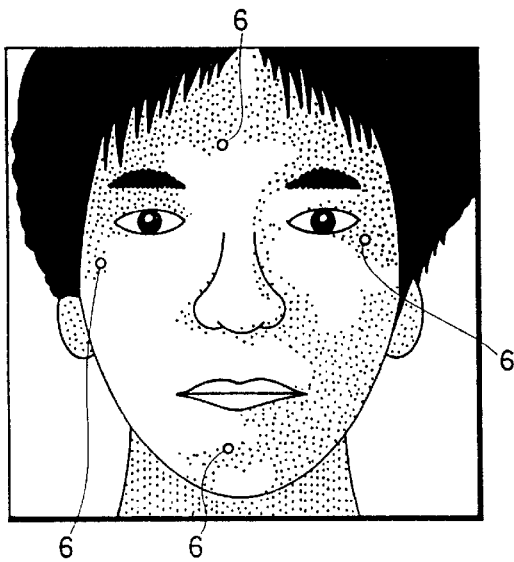
FIG. 3A PRIOR ART
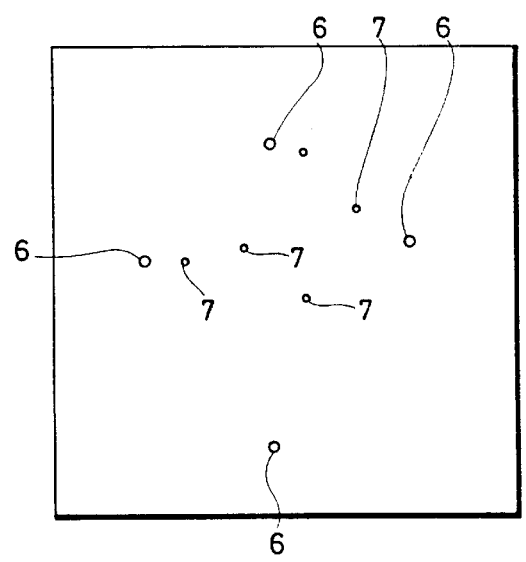
FIG. 3B PRIOR ART

FIG. 8

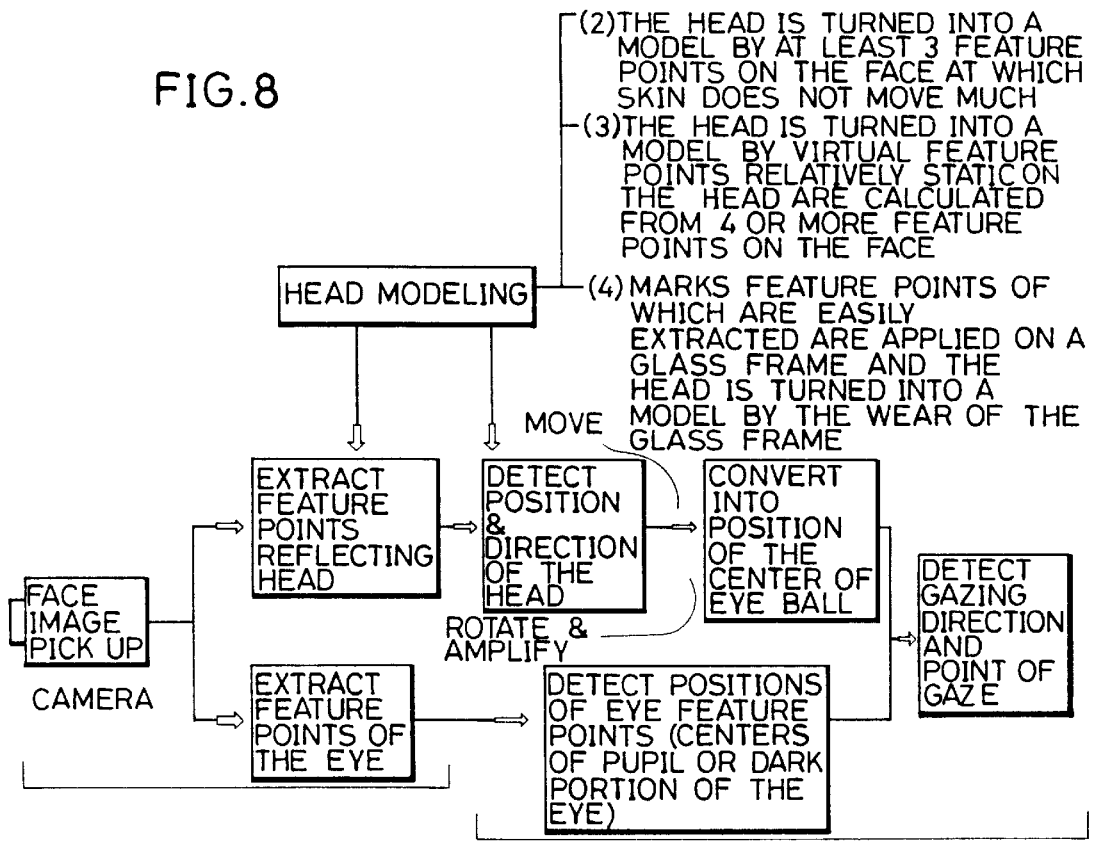

FIG. 9

| FEATURE | CHARACTERISTICS |
|---|---|
| IMAGE REFLECTED FROM CORNEA | ·VIRTUAL IMAGE FORMED BY LIGHT REGULARY REFLECTED FROM CONVEX SURFACE OF THE CORNEA<br>·APPROXIMATELY PROPORTIONAL TO THE MOVEMENT OF EYE FIXATION MOVES IN THE SAME DIRECTION AS THE EYE BALL |
| DARK PORTION OF THE EYE | ·OBAERBED FOR DIFFERENCE IN INTERISTY OF LIGHT REFLECTED FROM IRIS & SCLERA<br>·MEANS IN THE SAME DIRECTION AS THE EYE BALL<br>·IT CAN BE EXTRACTED BY ROOM LIGHT ONLY NO NEED OF REFERENCE LIGHT |
| PUPIL | ·MEASURED BY USING DIFFERENCE IN INTENSITY OF LIGHT REFLECTED FROM IRIS AND RETINA AT THIS OPENING<br>·MEANS IN THE SAME DIRECTION AS THE EYE BALL<br>·RELATIVELY FREE FROM THE MOVEMENT OF EYE LID |
| FACE | ·POINTS SUCH AS MEDIAL & LATELAL ANGLES OF THE EYE LIP ETC CAN BE DETECTED BY THE DIFFERENCE IN COLOR<br>·PORTION OF 3 FEATURE POINTS ARE SUFFICIENT TO BE CONVERTED TO THE CENTER PORTION OF EYE BALL |

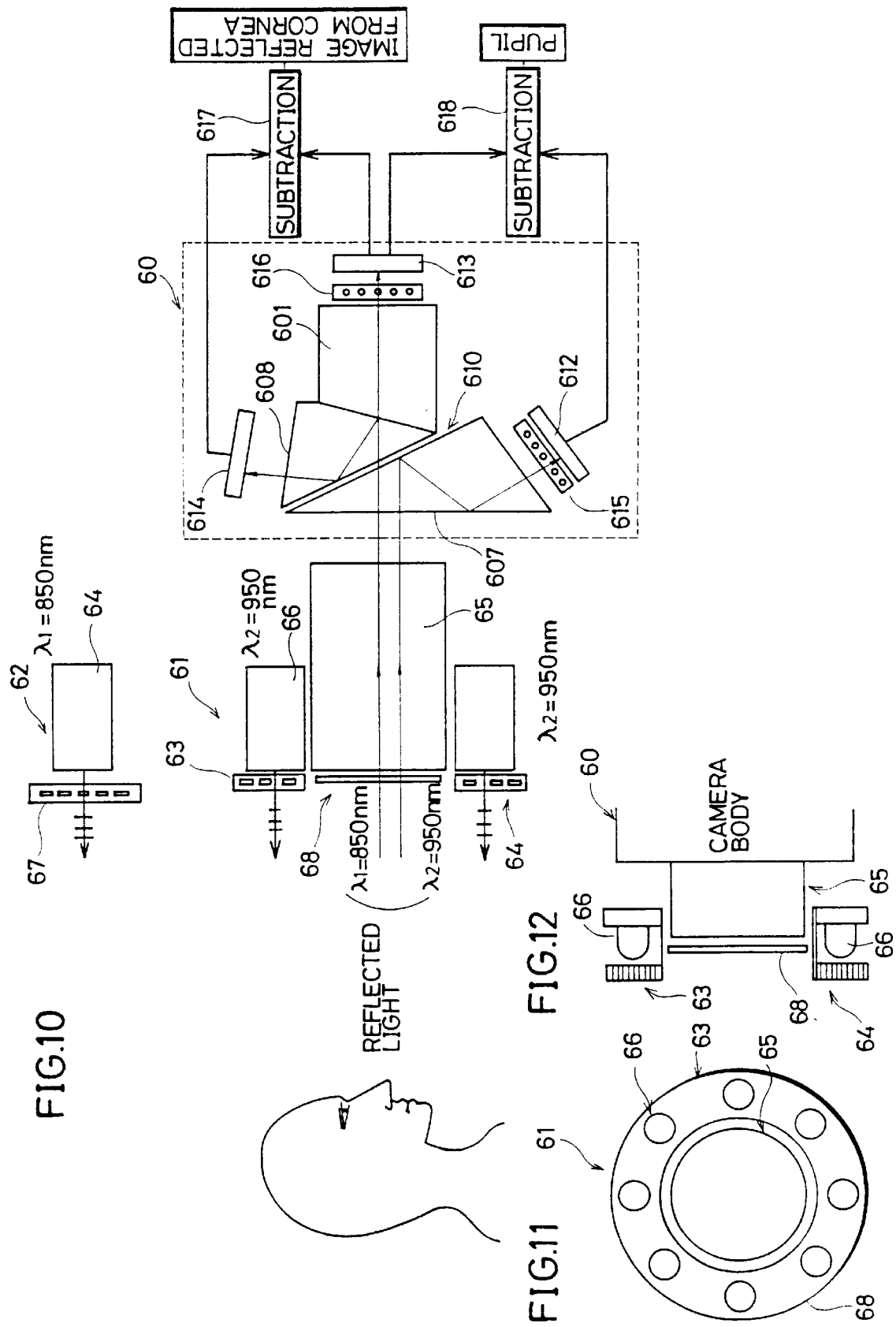

FIG.15A
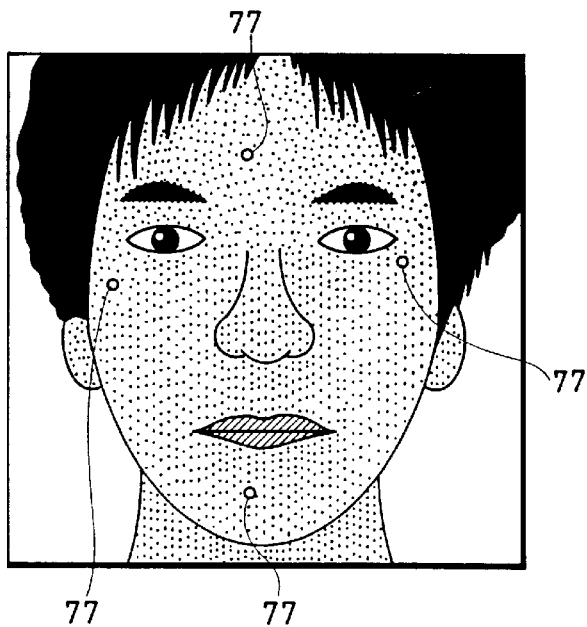
FIG.16A
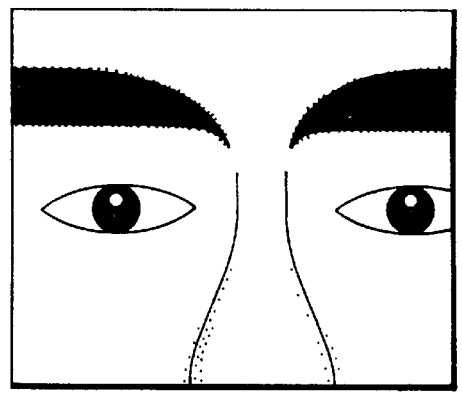
FIG.15B
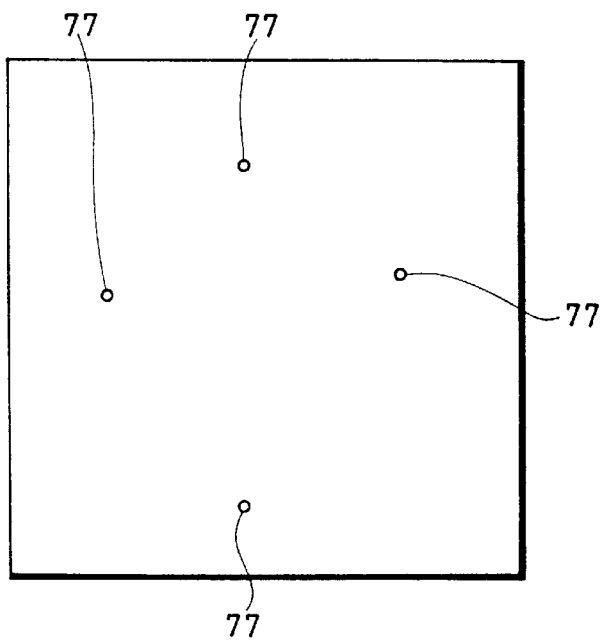
FIG.16B
FIG.16C
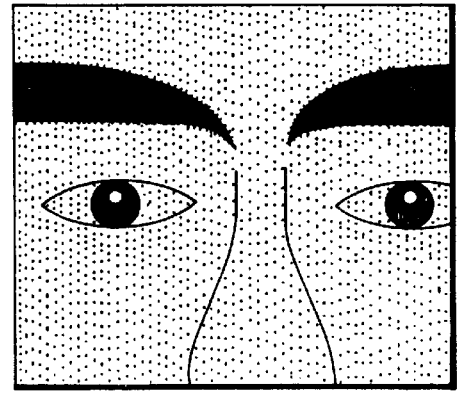

(a) DRIVING TIMING OF IMAGE PICK UP APPARATUS (b) DRIVING TIMING OF ILLUMINATING APPARATUS (a) DRIVING TIMING OF IMAGE PICK UP APPARATUS (b) DRIVING TIMING OF ILLUMINATING APPARATUS

RELATION
$\vec{L}_i + t_i(\vec{D}_i - \vec{L}_i) = R_i^{-1}\vec{e} + \vec{P}_{Gi}$

METHOD OF DETECTING EYE FIXATION USING IMAGE PROCESSING

This application is a division of application Ser. No. 07/378,626 filed Jul. 12, 1989 now U.S. Pat. No. 5,016,282.

BACKGROUND OF THE INVENTION

1. Field of the Invention

The present invention relates to an image pickup apparatus and a method for eye tracking employing the same. More specifically, the present invention relates to an image pickup apparatus which can effectively utilize movement of a person and movement of the eyes in the field of man-machine interface and of intelligent visual communication so as to facilitate extraction of features of an object to be imaged, or picked up, by using an illuminating apparatus, and to a method of eye tracking for detecting eye fixation in non-contact manner by using feature points of one's face, pupils and images reflected from cornea and so on extracted from the images picked up by the image pickup apparatus.

2. Description of the Related Art

Recently, computers have been developed to realize complicated and various functions, and the application field thereof has become wider and wider. Not only experts but ordinary people have come to use computers. In order to facilitate usage of systems which have been and will be more and more complicated, the technology of man-machine interface becomes more and more important. Human beings communicate not only by the language but also expressions and gestures, assuming and conforming intentions of the partner. Especially, the eye movement plays an important role for enabling a good communication.

The movement of the eyes much reflects one's intention. If the movement of gazing points on a screen of a user facing some displaying apparatus can be continuously detected in an interface, it may be a good help to know the intention of the user. It may be a good help to know where the user watches as it leads to what the user has in mind or what he is wondering about.

In view of the foregoing, the inventors of the present application have pointed out the importance of an effective eye tracking method for realizing an interface function capable of supposing an intention of operation of the user to respond flexibly and for realizing, in the field of intelligent communication, a very responsive and receiver oriented visual communication by extracting an object of interest in accordance with the movement of the eyes of a receiver and by feeding the same back to a transmitter.

An eye camera has been well known as the above described eye tracking apparatus. However, the eye camera is not very suitable for utilizing the movement of the eyes in the man-machine interface or in visual communication, since a user must wear glasses and the head of the user must be fixed in order to track eye fixation in a coordinate system of a display which the user faces. A method of detection utilizing image processing is more convenient in detecting eye movement in a non-contact manner without the need of wearing any special device.

FIG. 1 shows an example of a structure of a non-contact eye tracking apparatus. Referring to FIG. 1, cameras 2, 3 and illuminating apparatuses 4 and 5 are respectively provided on both sides of a display 1. In such a non-contact eye tracking apparatus, a first problem to be solved is to pickup by the cameras 2 and 3 the images of a user illuminated by the illuminating apparatuses 4 and 5 and to extract a plurality of feature points necessary for tracking eye movement from the picked up images. The second problem is to measure the spatial positions of the feature points at high speed with high precision. The third problems is to find the direction of eye fixation and the gazing points on the display based on the positions of the feature points.

Since a person and especially his eyes move fast, clear images must be picked up and the features points must be extracted by simple image processing, in order to follow and detect the movement exactly. However, in the actual application in a room, illumination of the user changes as the reflection of light from the display is influenced by external illuminations such as fluorescent lamp, so that images of good and uniform quality cannot be always provided. If the inputted images are inferior in quality, it takes much time to reduce noise, and accordingly, fast operation cannot be expected.

A person who is the object to be picked up may be illuminated in order to solve the above described problem. However, such illumination has the following drawbacks. First, it is difficult to provide a natural environment for the interface. More specifically, incandescent lamps, xenon lamps and halogen lamps have been well known as illuminating apparatuses, which have wide range of wavelength, and the distribution thereof is centered on the visible wave range. Therefore, it is not very good to illuminate the user from ahead to provide natural interface.

Secondly, the apparatus becomes large, and much heat is generated. Namely, in order to improve the conditions of illumination of the conventional illuminating apparatuses in view of the application to the interface, optical parts such as a band-pass filter and a polarizer must be attached in front of the illuminating light source. For example, when a near infrared illumination which cannot be sensed by a human being is used to catch the reflected light, visible lights must be intercepted. However, the above mentioned conventional illuminating apparatuses have low efficiency in emitting light and much heat is generated therefrom. Consequently, the temperature around the apparatus becomes higher. Consequently, the apparatus cannot be made compact by, for example, providing a light source and the optical elements integrally, so that a large illuminating apparatus must be inevitably used.

Thirdly, although illumination is effective in extracting feature points and clear images are provided when the illumination is properly used, if the illumination is improperly used, the illumination becomes a noise source and provides reverse effect. Detailed description will be given in the following using a case of extracting feature points of a person or the eyes, as an example.

FIG. 2 shows an example of an experiment to extract blue marks corresponding to a face of a person using the conventional illuminating apparatus and the image pickup apparatus. FIGS. 3A and 3B show an example of extraction of the feature points of the face provided by the experiment shown in FIG. 2.

Blue marks 6 are applied on 4 portions of the face as shown in FIG. 3A. Reference light 9 is emitted from the illuminating apparatus 8 to an object 10 as shown in FIG. 2, the light reflected from the object is caught by a camera 10, blue component is extracted from the picked up image and is thresholded. The result is as shown in FIG. 3B. As is apparent from FIG. 3B, noise components 7 as well as the blue marks 6 are taken. The reason for this is as follows. Namely, when the object 10 is illuminated by the reference light 9, the light reflected therefrom can be divided into two components in a broad sense. One is the light 11 diffused and reflected at the surface of the object 10, which reflects the optical nature of the material reflecting the light. Therefore, the component is effective in extracting features points such as parts of the face (mouth, eyelash, nose and so on) and. the pupil, except the images reflected from cornea, out of those feature points which are necessary in eye tracking. The other is the component regularly reflected from the surface of the object 10, which reflects the optical nature of the light source. The component 12 does not reflect the nature of the object 10, so that it tends to be the noise. The latter component is included much at smooth portions of the object 10. More specifically, when the object is a person, sweats on the face, glass frame, glasses, plastics and glasses around that person and so on are such smooth portions. In the example shown in FIG. 3B, the noise 7 corresponds to the sweat.

In the example shown in FIGS. 3A and 3B, blue marks applied on the face are extracted. The foregoing is similarly applied when marks of different colors are used and the color components are to be extracted. The regularly reflected component 12 becomes noise in most case, when portions such as the eyes, nose, mouth and eyelashes are extracted from the natural image without using marks. A so-called active stereo vision is used as another method for detecting the shape of one's face without using marks, moire topography and slit ray method are the representatives of such method, in which the object is illuminated by a prescribed controlled shape pattern, thresholded images (reflected pattern) are extracted from the reflected images and the three dimensional shape of the object is measured by using the feature of the reflected pattern corresponding to the extracted pattern. In this method also, if the object tends to regularly reflect light, images formed by the regular reflection becomes noises, making it difficult to properly extract the reflected patterns, which are the features of the object.

Problems in association with the arrangement of the conventional illuminating apparatus and of the efficiency in extracting pupil feature point will be described in the following. In order to detect eye fixation of a user wearing no special device, a plurality of feature points must be extracted by image processing, as will be described later. A pupil is an opening of an iris, which generally looks dark. Therefore, the iris is dark brown, the pupil must be distinguished from the iris to be extracted. The pupil is a good feature point which is widely applied, since the size of the pupil is convenient, it is not very much influenced by the movement of eyelid, and it is convenient in the conversion to the eye fixation. The extraction of the pupil has been carried out in an eye camera and so on and a number of methods for extraction of pupil have been known. For example, such methods are disclosed in U.S. Pat. No. 4,102,564, U.S. Pat. No. 4,145,122, U.S. Pat. No. 3,689,135, U.S. Pat. No. 4,075,657, U.S. Pat. No. 4,755,045, U.S. Pat. No. 4,303,394, U.S. Pat. No. 4,651,145 and U.S. Pat. No. 4,702,575. In one type of eye cameras, a light source is incorporated in glasses to illuminate the eyeballs, and the reflected light is picked up to measure the intensity of the reflected light from the pupil and from the iris. In an apparatus such as an eye camera which is used attached on ones head, the distance between the illuminating apparatus and the image pickup apparatus is small and the apparatus moves corresponding to the movement of the head. Therefore, the illuminating apparatus have only to illuminate the eyeballs, and the image pickup apparatus have only to pick up the images of the eyeballs. Therefore, the influence of noise is small and the pupil can be extracted dependent only on the difference in intensity of the reflected light from the pupil and from the iris.

However, eye tracking for the application to the interface must be carried out in the non-contact manner as described above. Therefore, not only the portions of eyeballs but a widerange permitting tracking of a movement at a distance should be taken. For example, a method for extracting pupils out of images of one's face must be considered. In such case, it is very difficult to separate the pupils from the background noises by the above described methods.

FIG. 4 shows another method for extracting the pupil, in which the light enters the pupil and the light reflected from the retina is picked up. Referring to FIG. 4, a half mirror 23 is provided on an optical axis 22 of a taking lens 21 of a camera 20, and a conventional illuminating apparatus 24 is arranged such that the optical axis thereof coincides with the optical axis 22 by means of the half mirror 23. In order to make uniform the distribution of the reflected intensity from the pupil by using an illuminating apparatus with one light source, that is, in order to obtain an image of the pupil having little unevenness in intensity, the usage of the half mirror 23 is essential.

A visible wavelength cut off filter 25 is provided in front of the illuminating apparatus 24. The visible wavelength component of the light from the illuminating apparatus 24 is cut off by this filter 25, and the remaining part of the light meets the optical axis 22 of the lens 21 to illuminate the user 26. The light enters the pupil of the user 26, reflected at the retina, passes through the half mirror 23 to be picked up by the camera 20. Therefore, the pupil is taken brighter than the iris.

However, the method shown in FIG. 4 had the following drawbacks. Namely, the apparatus becomes large as it employs a half mirror 23. When the range of image pickup is not only the portions near the eyeballs but wider including, for example, the face itself, the influence of the noise becomes large even in this method, making it difficult to extract pupils properly. In order to reduce the influence of noises, the intensity of illumination may be increased. However, it is not very effective since the intensity of light is reduced by the visible wavelength cut off filter 25, further reduced to ½ by the half mirror 23, and the reflected light is further reduced to ½ by the half mirror 23, that is, much of the light from the illuminating apparatus 24 is lost by the time it is caught by the camera 20. When the intensity of illumination is increased, much power is consumed and much heat is generated. In order to reduce other influences, respective parts may have to be mounted apart from each other, which leads to further increase in size of the apparatus. If the illumination is too intense, it will be the physiological burden on the eyes of the user. Therefore, this method is not suitable either to be attached aside the display for the application to the interface.

An image reflected from cornea is a the virtual image formed by the light regularly reflected on the convex surface of the cornea, and it moves in the same direction at the eyeballs in accordance with the movement of eye fixation. Therefore, it is one of the feature points necessary for eye tracking. A problem in extraction is separation from background noise.

FIG. 5 shows an example of an apparatus which takes images reflected from the cornea by a camera. Referring to FIG. 5, when light from a reference light source 31 illuminates eyes of a user 30, images reflected from the cornea which are necessary for eye tracking are picked up by the camera 32. However, not only the light from the reference light source 31 but also from the display surface of the display 33 and from external illumination 34 such as a fluorescent lamp enter the eyes of the user 30, which is reflected from the cornea to provide virtual images. Therefore, there are various images reflected from the cornea in the eyeball, which are the noises making difficult the extraction of the images reflected from the cornea made by the light from the reference light source 31.

When a moving object such as a person or eyes is to be photographed, the photographing time should be as small as possible in order to provide images without blurring. A camera with an electric shutter has come to be used recently. Such cameras having short photographing time require intense illumination. However, if a conventional illuminating apparatus is used for illuminating the user in the interface, the user is exposed to heat and intense light for a long period of time, which may affect the eyes or the body of the user.

Meanwhile, stereo vision measurement has been known in the field of measuring spatial positions of the feature points. However, since the extraction of the feature points was difficult as described above, real time measurement of the spatial positions of the feature points on the face or of the eyeballs has not yet been carried out taking the use for the interface in consideration.

Some methods have been proposed for eye tracking by image processing. However, various conditions must be satisfied to apply any of these methods for eye tracking and therefore the field of application is limited, since effective extraction of the feature points is difficult and high speed detection of the spatial positions is difficult in any of these methods. In most of these methods, one white and black camera is employed. One such example will be described in the following.

FIG. 6 illustrates a method for detecting the iris and pupil in the white of the eye on a picked up image to detect eye fixation by using the same. Referring to FIG. 6, the face of a person is picked up, or imaged, by a camera 41, the portion 42 of the eye is extracted from the picked up image of the face, and the dark portion 43 and the white 44 in the eye are separated from each other. Thereafter, the length a of the white 44 and the length x from an edge of the white 44 to the center of the dark portion 43 are calculated. The direction of eye fixation is approximately in proportion to x/a. Since the process for extracting the white 44 and the dark portion 43 of the eye is difficult to carry out at a high speed, real time detection has not yet been realized. In this method, the degree of freedom is limited to the rotation movement of the eyeball unless the position and direction of the face are calculated by some method or another. The precision in detecting the rotation of the eyeball is not very high, since the size of the eye changes as the user changes his expression. The upward and downward movement of the eye is especially unique and complicated, as the dark portion 43 changes influenced by the movement of the eyelid.

FIG. 7 illustrates a method for detecting the pupil and the images reflected from the cornea as feature points by one camera. Referring to FIG. 7, the position of a reference light source 51 is assumed to be known in association with the coordinate system of the camera 50. The spatial position of the image 53 reflected from the cornea generated by the reference light from the reference light source 51 and the spatial position of the pupil 54 are determined independently based on the position of the center of rotation of the eyeball 52 and on the rotation angles $\alpha$ and $\beta$ in the upward, downward, left and right directions of the eyeball. Therefore, when the position of the image reflected from the cornea, the position of the pupil 54, the radius a of the eyeball which is the structural parameter of the eyeball 52, the radius of curvature c of the cornea, and the distance b between the center of the eyeball to the center of the curvature of the cornea are known, the center of rotation of the eyeball 52 and the rotation angle of the eyeball 52 are determined, and accordingly eye fixation can be determined. The positions of the image 53 reflected from the cornea and of the pupil 54 can be obtained from one projected image by providing a condition that the distance from the camera to the eyeball 52 is approximately constant. In this manner, the eye fixation can be detected in association with the rotation angle $\alpha$ in the left and right directions and the rotation angle $\beta$ in the upward and downward directions of the eyeball 52. However, the precision in detection becomes lower when the face moves in the direction of the z axis, from the above described condition.

In the examples shown in FIGS. 6 and 7, it is difficult to detect the gazing point, since only one camera is employed. If any one of the above described methods is to be applied to the interface, it is necessary to know what point on the display the user is gazing. Therefore, the gazing point must be provided in the display coordinate system. In order to know the gazing point of the user on the display coordinate system, it is necessary to have the user gaze a predetermined point on the display surface and to calibrate the system based on the data. However, when only one camera is used, there will be various and many parameters for calibration, which make the calibration complicated and inferior in precision.

SUMMARY OF THE INVENTION

Therefore, a main object of the present invention is to provide an image pickup (or detection) apparatus capable of effectively extracting feature points which are necessary for detecting, by image processing, movement of a person and movement of the eyes.

Another object of the present invention is to provide an image pickup apparatus employing an illumination which is not sensed by the eyes of a user, generate less heat, compact and not bulky and which does not cause a feeling of physical or mental incompatibility of the user.

A further object of the present invention is to provide an image pickup apparatus which removes, when an object is illuminated, regularly reflected component as noises out of the light reflected therefrom to effectively extract diffused reflected component from the feature portions of the object, such as the pupil or the dark portion of the eye.

A still further object of the present invention is to provide an image pickup apparatus which facilitates thresholding process and accordingly to improve efficiency in extracting, by increasing S/N of the pupil portion against the background.

A still further object of the present invention is to provide an image pickup apparatus which effectively extracts regularly reflected component when a reference light illuminates an object, so as to form an image reflected from cornea.

A still further object of the present invention is to provide a method for eye tracking which can detect movement of eye fixation of a user in a non-contact manner without using any special device on the user, based on images from the object picked up by the image pickup apparatus.

A still further object of the present invention is to provide a method for eye tracking which can detect eye fixation at high speed and with high precision while permitting free movement of the head of the user.

A still further object of the present invention is to provide a method for eye tracking in which a gazing point can be detected on a display coordinate system which the user actually watches, and in which calibration can be carried out in a simple manner at the time of detection.

Briefly stated, in the present invention, illuminating means illuminates an object to be picked up with polarized light, an image is formed by the light reflected from the object by means of an optical system, regularly reflected component out of the reflected light is cut off by a polarizing element, the diffused reflected component is extracted, and the diffused reflected component is detected by image detecting means.

Therefore, in accordance with the present invention, the regularly reflected component and the diffused reflected components in the light reflected from the object are separated from each other, so that an image with less noise can be provided, which enables effective image processing such as thresholding and extraction of feature points. As for the image reflected from the cornea, extraction of the feature points can be stably carried out as noise components generated from the sources other than the reference light source are removed from the reflected light, and therefore noise reduction can be realized by simple algorithm, enabling image processing at high speed.

In a second aspect of the present invention, a portion of the light reflected from the object is separated to form an image by first image forming means, a portion of the reflected light is separated, polarized and regularly reflected components are cut off, and an image including the non-polarized diffused reflection component is formed by second image forming means, the formed respective images are detected by image detecting means, and a difference image between the image including the regularly reflected component and the image including only the diffused reflection component is provided.

Therefore, in accordance with the present invention, a difference between an image formed by using the light reflected from the object as it is and the image formed by cutting off the polarized component and using only the remaining diffused reflected component is provided, whereby the regularly reflected image can be effectively extracted as the polarized component.

In accordance with a third aspect of the present invention, a plurality of light sources, for example light emitting diodes are arranged near an optical axis of a taking lens for taking the object, an image is formed by the light reflected from the object by means of an optical system, and the formed image is detected by image detecting means.

Therefore, in accordance with the present invention, by appropriately arranging illuminating means employing light emitting diodes, an image of the pupil can be taken brighter or darker than the background. Since the difference between the bright and dark images can be provided, the pupil portion can be emphasized against the background, whereby stable and effective extraction of the pupil is enabled, as the emphasized image include less noise component in the signal components. In addition, the extraction of the pupil can be effectively carried out at high speed, since only a simple subtraction image processing is needed.

In accordance with a fourth aspect of the present invention, first illuminating means including a plurality of light sources is arranged near the optical axis of the taking lens, second illuminating means arranged spaced apart by more than a prescribed distance from the optical axis of the lens, the light reflected from the object illuminated by the first illuminating means and the light reflected from the object illuminated by the second illuminating means are separated to form images, and the formed images are detected.

Therefore, in accordance with the present invention, the pupil can be taken brighter than the background by the light from the first illuminating means, and the pupil can be taken darker than the background by the light from the second illuminating means. The light from the first illuminating means enters through the pupil and is reflected at the retina to return to the direction of entrance of the light. Therefore, by arranging image forming means in the same direction as that of the illuminating light, the pupil can be taken brighter. The light from the second illuminating means similarly enters through the pupil and is reflected by the retina. However, no image forming means is provided in the direction of reflection, so that the pupil can be taken darker.

In a method for eye tracking in accordance with the present invention, the position and direction of one's head are detected from the image taken by an image pickup apparatus, and the position of the pupil, the dark portion of the eye or the image reflected from cornea which is the feature point of the eye is detected, and the eye fixation can be detected based on the detected position and direction of the head and on the position of the feature point of the eye.

Therefore, in the method for eye tracking in accordance with the present invention, the eye fixation is detected by the position and direction of the face and the position of the pupil, so that the number of parameters for calibration to detect the gazing point of the user is small. Therefore, calibration can be carried out in a simple manner, the precision in detection is high and the burden on the user is small.

In another aspect of the method for eye tracking, the position and direction of the head are detected from a taken image, the detected position of the head is moved and rotated to detect the central position of the eyeball whose position is stable and not dependent on the rotation of the eyeball, the position of the center of the pupil or the center of the dark portion of the eye, which is the feature point of the eye, is detected from the taken image, and the eye fixation is detected based on the detected central position of the pupil and the position of the feature point of the eye.

Therefore, in accordance with the present invention, by detecting the position and direction of the head, the position of the center of the eyeball can be obtained in association with the measurement coordinate system. Only one constant vector in approximation, is needed as a parameter necessary in this process, so that the calibration can be carried out in a simple manner, and the direction of eye fixation can be detected independent from the movement of the head of the user in a non-contact manner by finding the center of the eyeball and the spatial position of the pupil. Since the number of parameters for calibration is small, the precision can be increased. In addition, the direction of eye fixation of two eyes can be separately provided, therefore, overlapping of the direction of the eyes can be detected and accordingly eye fixation can be detected not only on a plane but three dimensionally. In addition, in the process for detecting eye fixation, the area of the pupil can be detected, so that the direction of eye fixation as well as the extension of the pupil can be detected simultaneously.

In a further aspect of the method for eye tracking, at least three feature points of a face with less movement of the skin are extracted from the taken image, the head is turned into a model by using these points, the position and the direction of the head are detected and the detected position of the head is moved and rotated. Consequently, the position of the center of the eyeball which is relatively stable and independent from the rotation movement of the eyeball can be detected and the center of the pupil of the center of the dark portion of the eye which is the feature point of the eye can be detected from the taken image, and the eye fixation is detected based on the detected position of the center of the eyeball and the position of the feature point of the eye.

Therefore, in accordance with the present invention, by using three points at the head as a model, the position and direction of the head can be detected based on three points on the face. If these three points are determined in advance, extraction of these three points can be facilitated by applying marks on these point, enabling detection of eye fixation at high speed.

In a preferred embodiment, marks whose feature can be easily extracted are applied to at least three portions on a glass frame, and the head is turned into a model by the marks when the user wears the glass. The position and direction of the head can be detected in accordance with the positions of the marks. Therefore, in this embodiment, the head can be turned into a model only by providing marks on glasses, whereby the position of the head can be detected in a simple manner. The position of the head can be exactly detected so long as the pair of glasses is fit on the face, and therefore the eye fixation can be detected in a simple manner with high precision.

In a further aspect of the method for eye tracking, reference light enters the eye, the position and direction of the head are detected from the taken image, the detected position of the head is moved and rotated, the position of the center of the eyeball which is independent from the rotation movement of the eyeball and is stable in position is detected, the position of the image reflected from cornea generated from the reference light is detected from the taken image, and the eye fixation is detected in accordance with the detected positions of the center of the eyeball and the image reflected from the cornea.

Therefore, in accordance with the present invention, by detecting spatial positions of the center of the eyeball and the image reflected from the cornea, the direction of eye fixation can be detected in non-contact manner independent from the movement of the head of the user.

In a more preferred embodiment, at least two image pickup devices are provided, and the positions of the feature points on the face, the feature points comprising marks and the feature point on the eye, reflecting the head are detected by the image picked up by the two image pickup apparatuses and by trigonometrical measurement.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows an example of a conventional non-contact eye tracking apparatus;

FIG. 2 shows an example of an experiment for extracting blue marks as feature points on a face of a person using the conventional illuminating apparatus and an image pickup apparatus;

FIGS. 3A and 3B show an example of extraction of feature points of the face provided by the experiment shown in FIG. 2;

FIG. 8 shows the concept of this invention;

FIG. 9 shows various types and natures of feature points necessary for detecting eye fixation;

FIG. 10 shows one embodiment of the image pickup apparatus in accordance with the present invention;

FIG. 11 is a front view of the taking lens shown in FIG. 10;

FIG. 12 is the side view of the taking lens;

FIG. 15A shows a diffused reflected image taken by one embodiment of the present invention, and FIG. 15B shows effects of extracting feature points;

FIGS. 16A to 16C show examples of extraction of the image reflected by the cornea;

DESCRIPTION OF THE PREFERRED EMBODIMENTS

Figure 4:
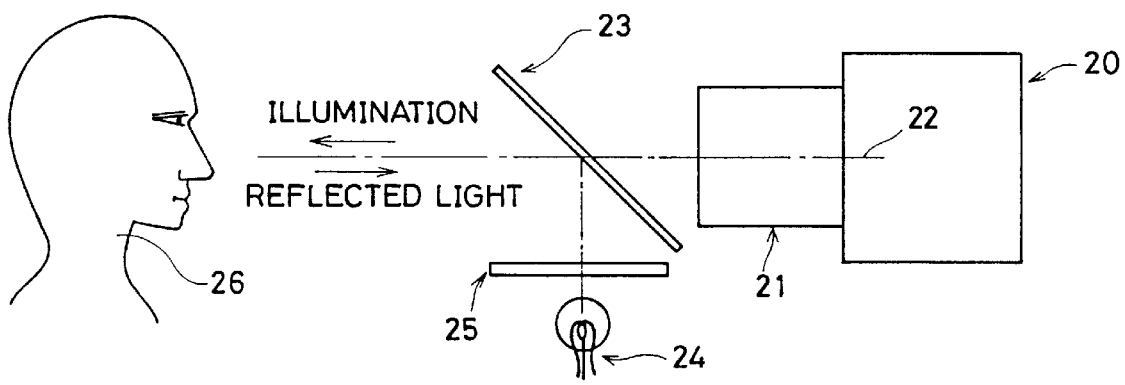
FIG. 4 shows another method for extracting pupils in which light enters through the pupil, and the light reflected at retina is taken.
Figure 5:
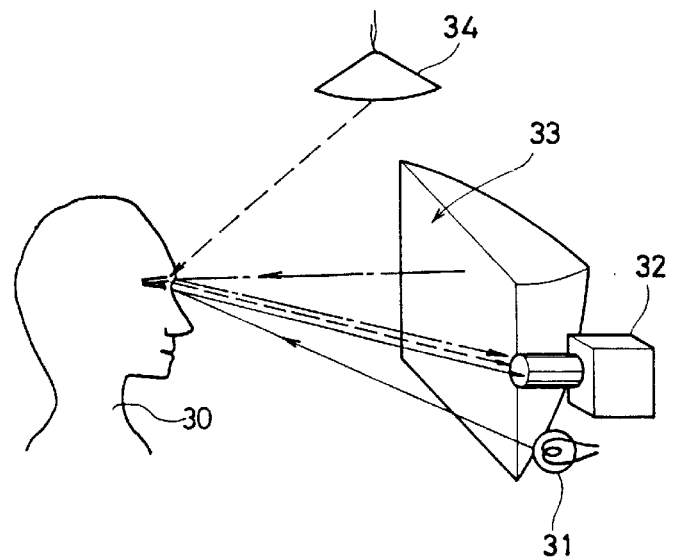
FIG. 5 shows an example of an apparatus in which an image reflected by cornea is picked up by a camera.
Figure 6:
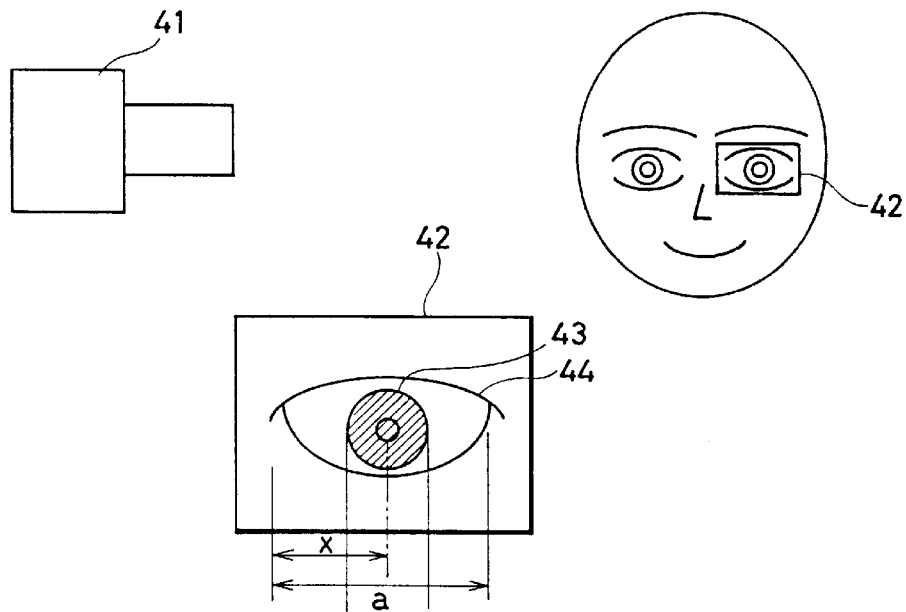
FIG. 6 illustrates a method for detecting a position of a dark portion of an eye on a taken image to detect eye fixation by using the same.
Figure 7:
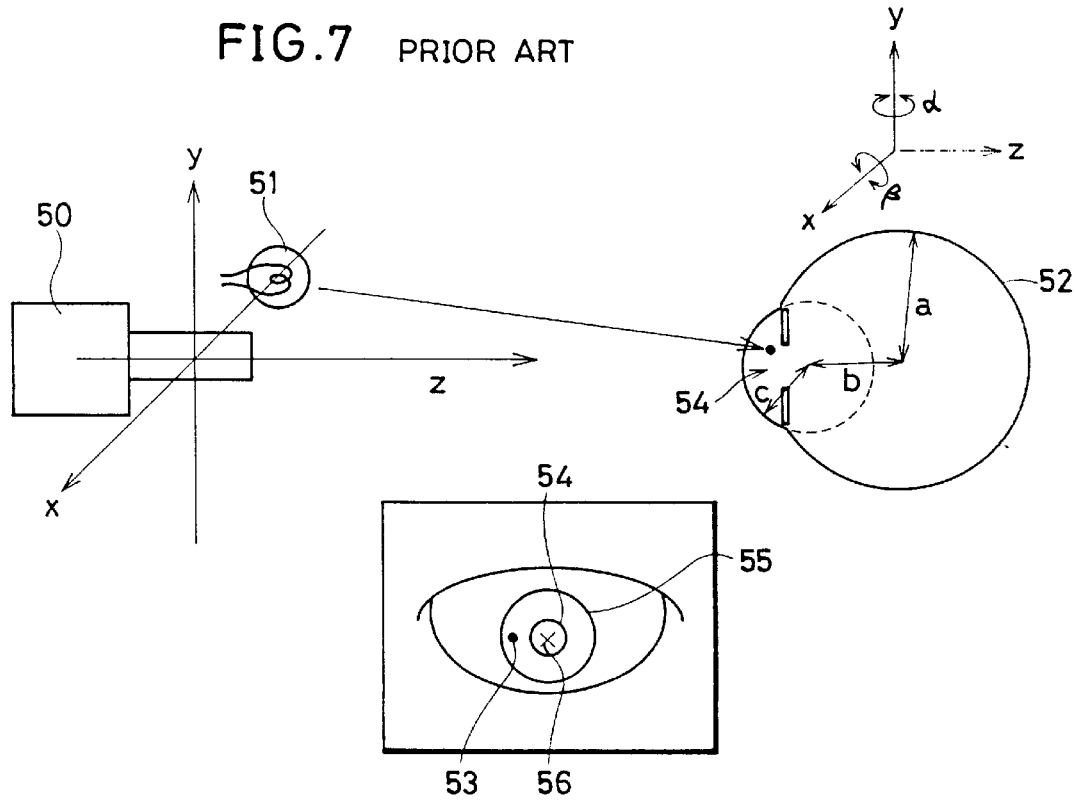
FIG. 7 illustrates a method for extracting the pupil and the image reflected from the cornea as feature points by one camera.

FIG. 8 shows the concept of the present invention and FIG. 9 shows types and characteristics of the feature points necessary for eye tracking.

First, referring to FIGS. 8 and 9, the concept of the present invention will be described. A face image is taken by a camera 60 and feature points reflecting the head and feature points of the eye are extracted from image signals, which are the outputs from the camera 60. The lateral angle of the eye, the medial angle of the eye, lip and so on can be detected by the difference in color as the feature points reflecting the head, as shown in FIG. 2. The feature points of the eye are the image reflected at the cornea, the dark portion of the eye and the pupil. The image reflected by the cornea is the virtual image formed by the light regularly reflected at the convex surface of the cornea, which moves in the same direction at the eyeball in proportion to the movement of the visual axis. The dark portion of the eye can be monitored by the difference in intensity of reflection between the iris and the retina. The movement of the dark portion can be extracted only by the room illumination with a reference light. The pupil can be detected by the difference in intensity of the light reflected from the retina at the iris and at this opening, and the pupil is not very much influenced by the movement of the eyelid.

The position and direction of the head are detected from the extracted feature points reflecting the head, and the results are converted into the position of the the center of the eyeball. Meanwhile, the center of the pupil and the center of the dark portion are detected from the extracted feature points of the eye, and the direction of eye fixation is detected in response to the result and the position of the center of the eyeball provided by the conversion.

The head is turned into a model. The turning into the model is carried out by using at least three feature points of the face at which the skin does not move very much. The position and direction of the head are detected based on the positions of the respective feature points on the face.

In turning the head into a model, at least three virtual feature points which are relatively static are taken out from at least four or more feature points on the face, and the position and the direction of the head are detected based on the positions of the virtual feature points.

Marks whose feature can be easily extracted are applied at least three portions on a glass frame, the head is turned into the model using the marks when the user wears the glasses, and the position and direction of the head are detected based on the positions of the marks.

FIG. 10 shows one embodiment of the image pickup apparatus in accordance with the present invention, FIG. 11 is a front view of a taking lens shown in FIG. 10 and FIG. 12 is a side view of the taking lens.

Referring to FIG. 10, an illuminating apparatus 61 and a lens 65 are arranged in front of a camera unit 60. The illuminating apparatus 61 comprises light emitting diodes 66 arranged around the lens, as shown in FIG. 11. A linear polarizer 63 is arranged in front of the light emitting diodes 66 and a visible wavelength cut-off filter 68 is arranged in front of the lens 65. The linear polarizer 63 polarizes the light emitted from the light emitting diodes 66, and the visible wavelength cut-off filter cuts off the visible light emitted from external illuminations such as a fluorescent lamp. An illuminating apparatus 62 is arranged at a position apart form the optical axis of the lens 65. The illuminating apparatus 62 comprises light emitting diodes 64 and a linear polarizer 67 provided in front of the same.

The camera unit 60 comprises three prisms 607, 608 and 609. A wavelength separating plane 610 is formed between the prisms 607 and 608, and a half mirror 611 is arranged between the prisms 608 and 609. A polarizer 615 and a CCD image pickup image element 612 are arranged facing the light emitting surface of the prism 607. A CCD image pickup element 614 is arranged facing the light emitting surface of the prism 608, and a polarizer 616 and a CCD image pickup element 613 are arranged facing the light emitting surface of the prism 609. The polarizing surfaces of the polarizers 615 and 616 orthogonally intersect the linear polarizers 63 and 67 provided in front of the illuminating apparatuses 61 and 62. The outputs from the CCD image pickup elements 613 and 614 are applied to subtraction (differential) image operation means 617 in which the image reflected by the cornea is extracted. The outputs of the CCD image pickup elements 612 and 613 are applied to subtraction operating means 618 in which the pupil is extracted.

Figure 13:
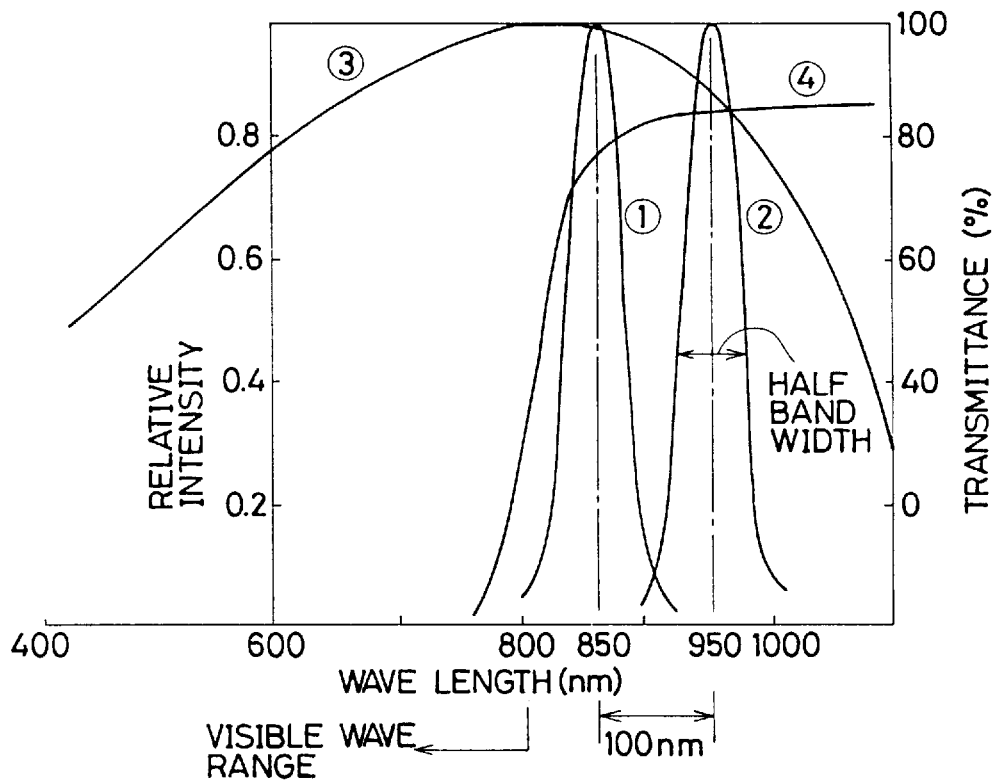
FIG. 13 shows optical characteristics of optical parts employed in one embodiment of the present invention.

FIG. 13 is a graph showing the optical characteristics of the optical parts employed in one embodiment of the present invention. Near infrared light, which cannot be sensed by one's eyes is used for the light emitting diodes 64 and 66 employed in the illuminating apparatuses 61 and 62 shown in FIG. 10. In this embodiment, the wavelength λ1 of the light emitting diode 64 is 850 nm while the wavelength λ2 of the light emitting diode 66 is 950 nm. The wavelength characteristics of the light emitting diodes 64 and 66 are as shown by ① and ② in FIG. 13. The characteristics of the visible light cut-off filter 68 provided in front of the lens 65 is represented by ④ in FIG. 13 and the sensitivity of the CCDs 612, 613 and 614 is as shown by ③ in FIG. 13. As is apparent from FIG. 13, the half-band width of the wavelength is narrow in each of the light emitting diodes 64 and 66, so that the light emitted from the respective light emitting diodes 64 and 66 do not interfere with each other when the central wavelength of the two differ from each other by approximately more than 100 nm. The light having such wavelength cannot be sensed by the eyes of a man. If the light is sensed by the eyes of a man, the wavelength of the emitted light may be changed to be longer. The CCD image pickup elements 612, 613 and 614 formed of silicon have sufficient sensitivity in this range of wavelength as shown in FIG. 13.

Figure 14:
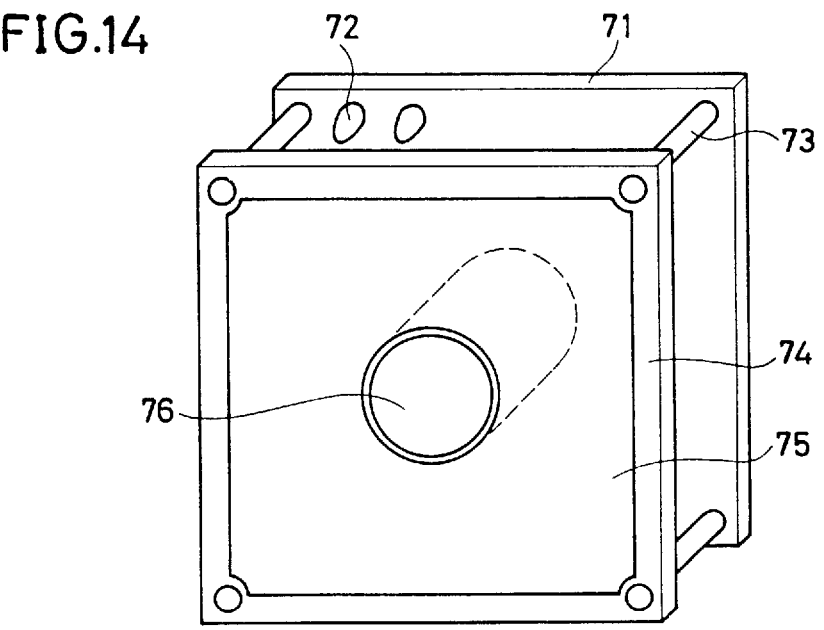
FIG. 14 is a perspective view showing an example of an illuminating apparatus comprising a light emitting diode and a polarizer provided as a unit.

FIG. 14 is a perspective view showing an overview of an illuminating apparatus comprising light emitting diodes and a polarizer provided as a unit, as an example. Referring to FIG. 14, light emitting diodes 72 are mounted on a base plate 71, and a frame 74 for mounting optical elements is attached to the base plate 71 spaced apart by a prescribed distance by means of a spacer 73. Optical elements 75 such as a polarizer, a visible wavelength cut off-infrared passing filter and so on are mounted on the frame 74. Holes for a camera lens are formed on the base plate 71 and on the optical element 75, and a cylinder 76 is provided for coupling these two holes.

As described above, in the example shown in FIG. 14, the optical elements 75 are covered by a frame 74 so as to increase mechanical strength to prevent skews or the like of the optical elements 75. This structure is especially important when the refractive index of the optical element 75 has anisotropy and the characteristics of the element changes dependent on the wavelength. More specifically, if the element has a skew as it is distorted or deflected, prescribed reference light may not be provided. The cylinder 76 prevents entrance of the reference light emitted from the light emitting diode 72 directly to the lens. Namely, the reference light and the reflected light are separated from each other by the cylinder 76.

An operation of one embodiment of the present invention will be described in the following with reference to FIG. 10. The light emitted from the light emitting diodes 64 and 66 of the illuminating apparatuses 61 and 62 is polarized by the polarizers 67 and 63, respectively, to illuminate a person. Light reflected therefrom enters the prism 607 through the visible light cut-off filter 68 and the lens 65. The light having the wavelength $\lambda 2$ (950 nm) is separated by the wavelength separating film 610 to enter the CCD image pickup element 612 through the polarizer 615 to form an image. Assuming that the polarization of the illumination by the illuminating apparatus 62 is in the transverse direction, then an image with the regularly reflected component cut off, that is, an image including the diffused reflection component is formed on the photosensitive surface of the CCD image pickup element 612 when the direction of polarization of the polarizer 615 is shifted by 90° to be in the vertical direction. Since the regular reflection occurs on smooth surfaces of the object, the optical characteristics of the light source are very well kept in the regularly reflected components.

Meanwhile, the diffused reflected component is modified by the absorbing-reflecting characteristics of the object. In order to extract feature points of the face and the pupil and the dark portion of the eye, the diffused reflected image should preferably be used in view of noise reduction and improvement of S/N. Meanwhile, the reflected light having the wavelength $\lambda_1$ passes through the visible wavelength cut-off filter 68, the lens 65 and the prism 607 to be divided by a half mirror 611 provided at the interface between the prisms 608 and 609. Part of the divided light enters CCD image pickup element 613 through the polarizer 616 to form an image, at the other part of the divided light directly enters the CCD image pickup element 614 to form an image. Therefore, an image including the regularly reflected component and the diffused reflected components is included in the outputs from the CCD image pickup element 614, while an image including the diffused reflected component only is included in the outputs from the CCD image pickup element 613. Since the intensity of the light passed through the polarizers 615 and 616 becomes ½, the ratio of division at the half mirror 611 is set at 1:2, so that the intensities of the images from the CCD image pickup elements 613 and 614 are approximately the same.

FIG. 15A shows a diffused reflected image picked up by one embodiment of the present invention, and FIG. 15B shows the effect of extracting feature points. In one embodiment of the present invention, an experiment is carried out to extract blue marks applied on a face of a person as feature points to confirm the principle of this invention. For comparison with the conventional image pickup method, not light emitting diodes but a white light source (halogen light) is used as the light source which is polarized to illuminate the object. A conventional 3 CCD color camera is used, and a polarizer whose direction of polarization intersect orthogonally with the polarizer employed for illumination is inserted in the image forming optical axis. FIG. 15A shows an example of extraction of the diffused reflected component out of the reflected light caught by the camera in accordance with the above described method. FIG. 15B shows images provided by extracting face color components out of the pixels of FIG. 15A and by thresholding the same. When we compare FIG. 15B with the conventional example shown in FIG. 3B, the noise is reduced and the blue marks 77 are effectively extracted as feature points.

The extraction of the images reflected from the cornea will be described in the following. The images reflected from the cornea are the virtual images formed by the light of the reference light source regularly reflected on the surface of the cornea. Therefore, in this case, the regularly reflected images are the desired signals. The extraction of the images reflected from the cornea is realized by extracting the difference between the images on the CCD image pickup elements 613 and 614 shown in FIG. 10 by the subtraction operating means 617. A problem in extracting the images reflected by the cornea in the prior art was that the light from external surfaces or from the display is reflected from the cornea to form images which overlap with the images derived from the reference light source. However, in one embodiment of the present invention, the light from the light emitting diode 64 is polarized, so that the images reflected from the cornea which is formed by reflection of the light from the light emitting diode 64 are cut off by the polarizer 614 orthogonally intersecting therewith, leaving the diffused reflected images. Therefore, the image reflected by the cornea can be extracted from the background by the subtraction operating means 617 as described above.

However, since the external illumination is not polarized in general, similar images are picked up by the CCD image pickup elements 613 and 614, and there is no difference between the images taken by these two elements. Therefore, the different image provided by the subtraction operating means 617 include less noise, whereby extraction of the image reflected by the cornea with high S/N can be realized.

FIG. 16A to 16C show example of extraction of the image reflected from the cornea. Examples shown in FIGS. 16A to 16C are the results of experiment for extracting the image reflected from the cornea using the same image pickup system as shown in FIG. 10, in order to confirm the above described concept. FIG. 16A shows an image provided form the CCD image pickup element 614, including the regularly reflected component and the diffused reflected component. FIG. 16B show images provided from the CCD image pickup element 13 including only the diffused reflected component. The subtracted image outputted from the subtraction operating means 617 corresponds to FIG. 16C, in which the images reflected from the cornea is clearly extracted from the background.

The extraction of the pupil will be described in the following. As shown in FIG. 10, the first illuminating apparatus 61 comprises light emitting diodes 66, which are arranged around the optical axis of the lens 65 as shown in FIG. 11. In the reflected image derived form the illumination of the illuminating apparatus 61, that is, the image outputted from the CCD image pickup element 612, the pupil is taken brighter than the background. Although the emphasize of the pupil against the background is not sufficient, the pupil can be extracted, if the range of application is limited. Meanwhile, the second illuminating apparatus 62 is arranged apart from the optical axis of the lens 65. The reflected image derived form the illumination of the illuminating apparatus 62, that is, the image provided from CCD image pickup element 613 or 614 the pupil is picked up dark. Therefore, by the subtracting operation between the image provided from CCD images pickup element 612 and the image provided from the CCD image pickup element 613 or by the subtracting operation between the image provided from the CCD image pickup element 12 and the image provided from the CCD image pickup element 14, the pupil is further emphasized against the background, whereby the extraction thereof is facilitated. Since the conditions of mounting the second illuminating apparatus 62 is not very strict as described above, it may be substituted by an external illumination such as the fluorescent lamp. However, in that case, the reflected light of the illumination must reach the CCD pickup element 613 or 614, therefore, the external illumination have to comprise near infrared component, or the lens visible wavelength cutting off filter 68 have to be removed.

Figure 17:
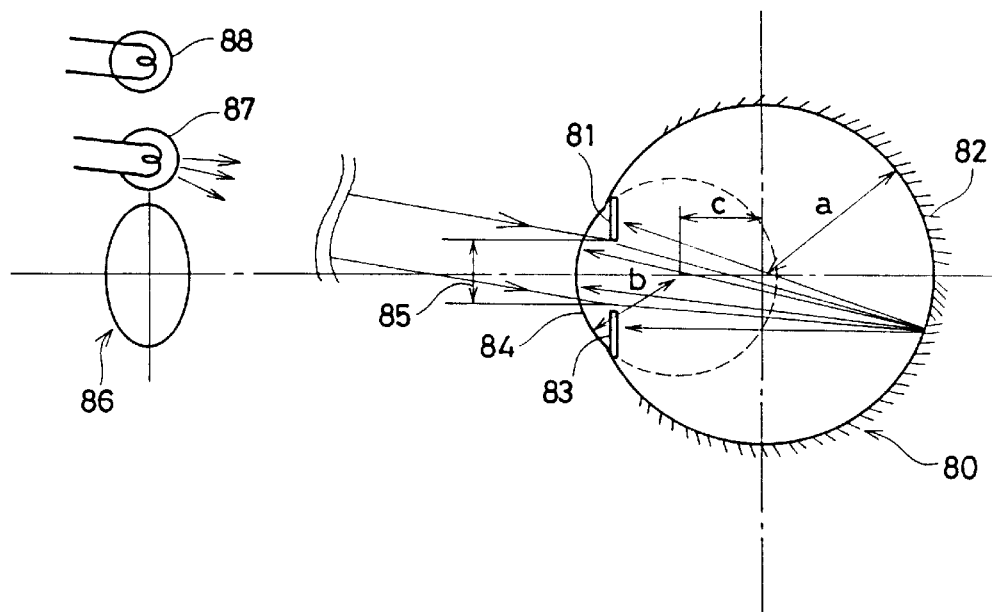
FIGS. 17, 18A, 18B, 18C and 19 illustrate arrangement of light sources by which the pupil is taken brighter.
Figure 18A:
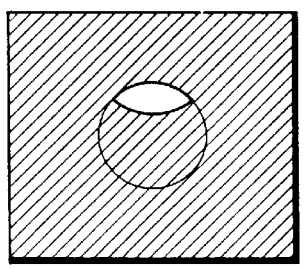
Figure 18B:
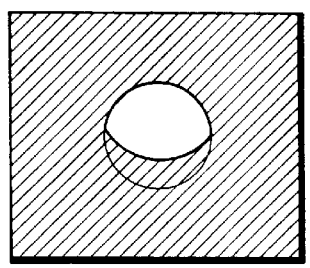
Figure 18C:
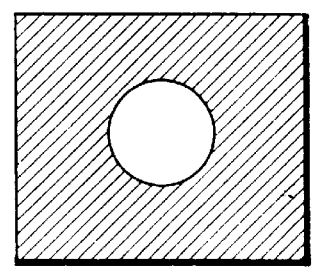
Figure 19:
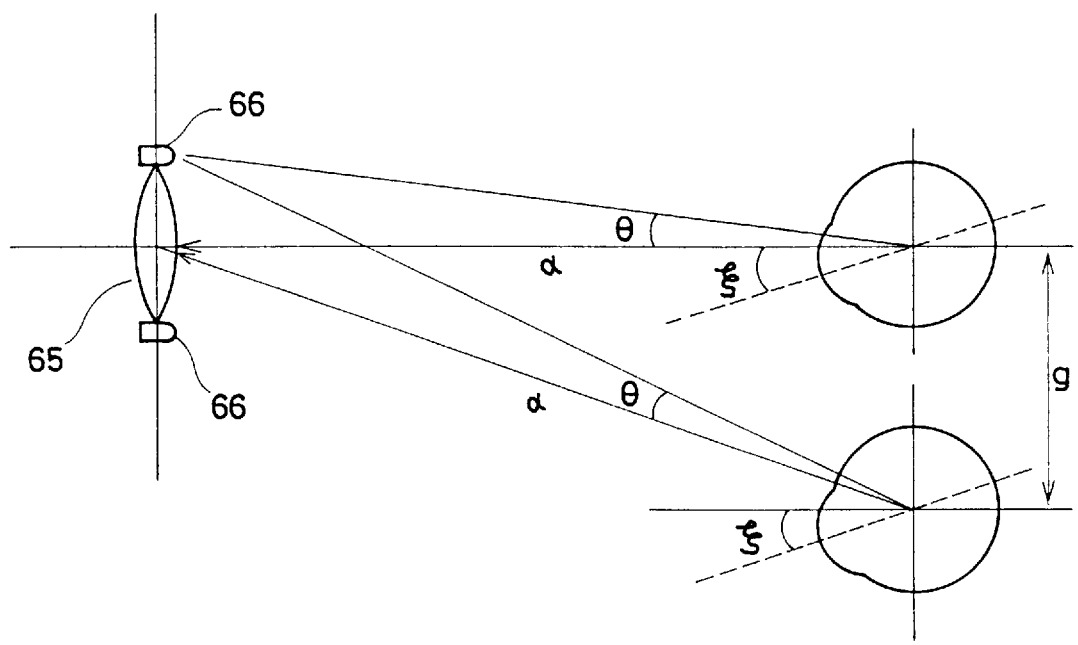

FIGS. 17, 18 and 19 illustrate arrangement of light sources for taking the pupil bright.

The relation between the positions of light sources and the brightness of the pupil will be described in detail in the following with reference to FIG. 17. The eyeball 80 may be regarded as a model of a composite sphere in which transparent spheres having different radii are overlapped with each other with the centers thereof spaced apart from each other. Let us consider a case in which the eyeball 80 which is on the optical axis of the taking lens 86 is illuminated and the light reflected therefrom is to be caught. An opening portion of the iris 81 of the eyeball 80 is the pupil 85. The light emitted from a light source 87 enters the eyeball through the pupil 85, reflected at the cornea, passes through the pupil 85 and reaches a diffusing reflecting surface 82 corresponding to the retina. Part of the light is absorbed by the retinal cells. The remainder of the light is diffused and reflected here. A part of the reflected. light which can pass through the pupil 85 again returns approximately to the direction of the light source. Therefore, if the taking lens 86 is arranged in this direction to catch the reflected light, the portion corresponding to the pupil 85 will be bright in the picked up image.

However, if the taking lens 86 is placed away from the light source 87, it becomes difficult to sufficiently catch the reflected light, and the area which is bright at the portion of the pupil 85 will have a unique shape. As shown in FIG. 17, if the light source 87 is placed near the optical axis of the taking lens 86, the bright area in the pupil 85 become larger as shown in FIG. 18B. However, if the light source is away from the taking lens 86, as represented by 88, the bright area is considerably biased, as shown in FIG. 18A. The center of the pupil 85 cannot be properly provided even if the thresholding operation is carried out to find the center, as the brightness of the pupil image is not uniform. Therefore, error may possibly occur in eye tracking. In view of the precision in eye tracking, it is particularly desired that the pupil 85 is picked up with uniform brightness.

Therefore, in one embodiment of the present invention, it is preferred that the light sources 87 are arranged near and around the optical axis of the taking lens 86. FIG. 18C schematically shows the pupil image picked up by using the illuminating apparatus 61 shown in FIG. 11. The light emitting diodes 66 shown in FIG. 11 serves to pickup a specified portion of the pupil 85 bright as shown in FIG. 18A. The pupil image picked up by the sum of the functions of the light emitting diodes 66 arranged around the optical axis is uniformly bright. The structure having the light sources 87 arranged near the lens optical axis is realized only when a compact and effective light sources such as light emitting diodes 66 are used.

Referring to FIG. 19, conditions for taking the pupil uniformly bright will be described in the following. Main parameters which influence the conditions of images pickup are as follows.

① Positions d, g of the eyeball with the position of the center of the lens being a reference, and rotation angle $\xi$ of the eyeball ② Position of the light source Out of the above mentioned parameters, the parameter ① is defined by the environmental condition in which the eye tracking method is employed. In the interface environment, the position d of the eyeball is 50 cm to 200 cm, the position g of the eyeball is ±30 cm and the rotation angle $\xi$ is ±20°. Under such conditions, the condition of arrangement of the light sources for taking bright at least a portion of the pupil as shown in FIGS. 18A and 18B is found through experiments. Namely, the condition is defined by an angle $\theta$ defined by a segment connecting respective light sources to the object to be picked up and the segment connecting the center of the lens to the eyeball, with the value of the angle $\theta$ being $\theta$th1 (5°) or less.

If the angle is no less than $\theta$th2 (6°), the pupil has no portion taken bright. Namely, whether the pupil is picked up bright or dark is determined by the angle $\theta$, with the boundary value being 5°. The values of $\theta$th1 and $\theta$th2 are set dependent on the conditions of the environment. Therefore, in the illuminating apparatus 61 for taking bright the pupil image, the respective light sources around the lens optical axis should be set with the angle no more than $\theta$th1. As for the number of the light sources, the more the better. Preferably, three of more light sources may be used.

By using the reference image provided by the subtraction between the image in which the pupil is taken bright and the image in which the pupil is taken dark, the portion of the pupil can be emphasized against the background.

Figure 20A:
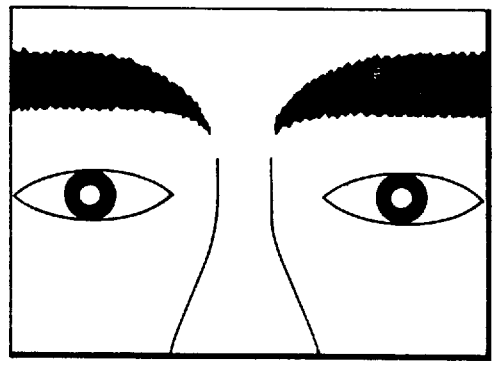
FIGS. 20A to 20C show examples of the image taken by the apparatus shown in FIG. 10.
Figure 20B:
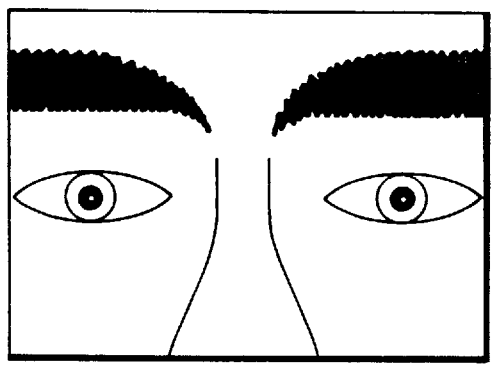
Figure 20C:
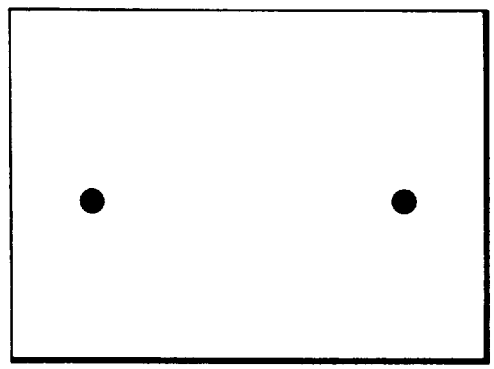

FIG. 20A to 20C show examples of the images picked up by the apparatus shown in FIG. 10. FIG. 20A is an image picked up by the CCD image pickup element 612, while FIG. 20B is the image picked up by the CCD image pickup image element 614. By thresholding the subtracted image, the portion of the pupil can be extracted with high S/N, as shown in FIG. 20C.

In one embodiment of the present invention, the pupil is picked up bright by taking the light reflected at the retina of the eyeball out of the pupil. This technique can be utilized for extracting feature points. More specifically, in a method of detecting position and direction of one's face by applying marks on the face and extracting these marks, transparent balls can be used as the marks.

Figure 21:
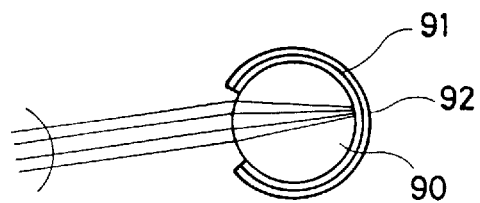
FIG. 21 shows an example of a mark applied to the apparatus of one embodiment of the present invention.

FIG. 21 shows an example of the mark applied to an apparatus of one embodiment of the present invention. Referring to FIG. 21, a diffusing reflecting layer 91 is formed by applying a coating such as a white paint on a glass ball 90. A coating such as a black paint is applied further thereon to provide a light absorbing layer 92. The light enters the glass ball 90 through an opening portion, reflected at the curvature of the opening portion and reaches the diffusing surface. Although no image is formed by the incident light on the diffusing surface, the incident light is condensed as shown in FIG. 21, since the curvature of the opening portion serves as a lens. The light reflected on the diffusing surface is reflected approximately in the direction of the incident light, as the curvature serves as the lens when the light passes through the opening portion.

Since the direction of the reflected light is near the direction of the incident light, when the reflected light is picked up by the image pickup apparatus of the embodiment shown in FIG. 10, the opening portion is taken brighter than that periphery in the image picked up by the CCD image pickup element 612. Since the reflected light derived from the light of the illuminating apparatus 62 provided apart form the taking lens 65 is not taken by the camera 60, as in the case of the eyeball, the opening portion becomes dark in the images picked up by the CCD image pickup elements 613 and 614. Therefore, by the subtracting operation between the two different images, the opening portion can be extracted as the feature point. In this manner, the opening portion of the glass ball 90 can be extracted in the similar manner as extracting the pupil. A glass ball 90 having the diameter of 3 to 5 mm may be used, which is preferably attached to a portion of the face on which the skin does not move much, or the glass ball may be embedded on the frame of glasses.

Figure 22:
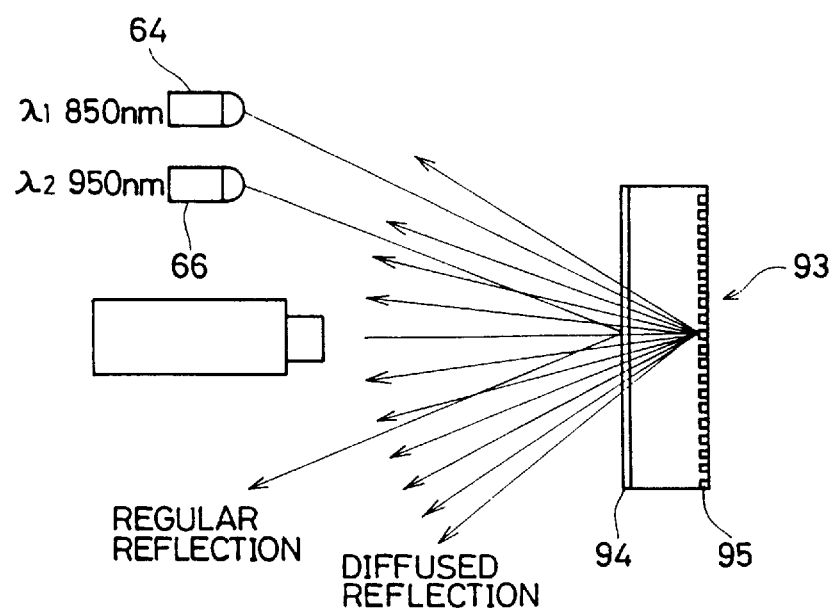
FIG. 22 is a cross sectional view showing another example of the mark.

FIG. 22 is a cross sectional view showing another example of the mark. Referring to FIG. 22, the mark 93 is a circle having the diameter of about 2 to 5 mm, which is formed by processing glass. A film 94 which transmits light having the wavelength longer than 900 nm and reflects the light having the wavelength no longer than 900 nm is formed on the surface, and the rear surface is a diffusing reflecting surface 95. Therefore, light having the wavelength longer than 900 nm is diffused and reflected by the rear surface to be caught by the camera. The light having the wavelength no longer than 900 nm is reflected on the surface of the mark 93. However, if the direction of reflection is different from the direction of the taking lens, the light is not picked up. In addition, since this light is regularly reflected, it can be cut off by using a polarizer. In the image picked by the CCD image pickup element 612 shown in FIG. 10, the marked portion becomes bright. In the image picked up by the CCD image pickup element 613, the mark becomes dark. Therefore, by the subtraction between these images, the marked portion as well as the pupil can be extracted.

Figure 23:
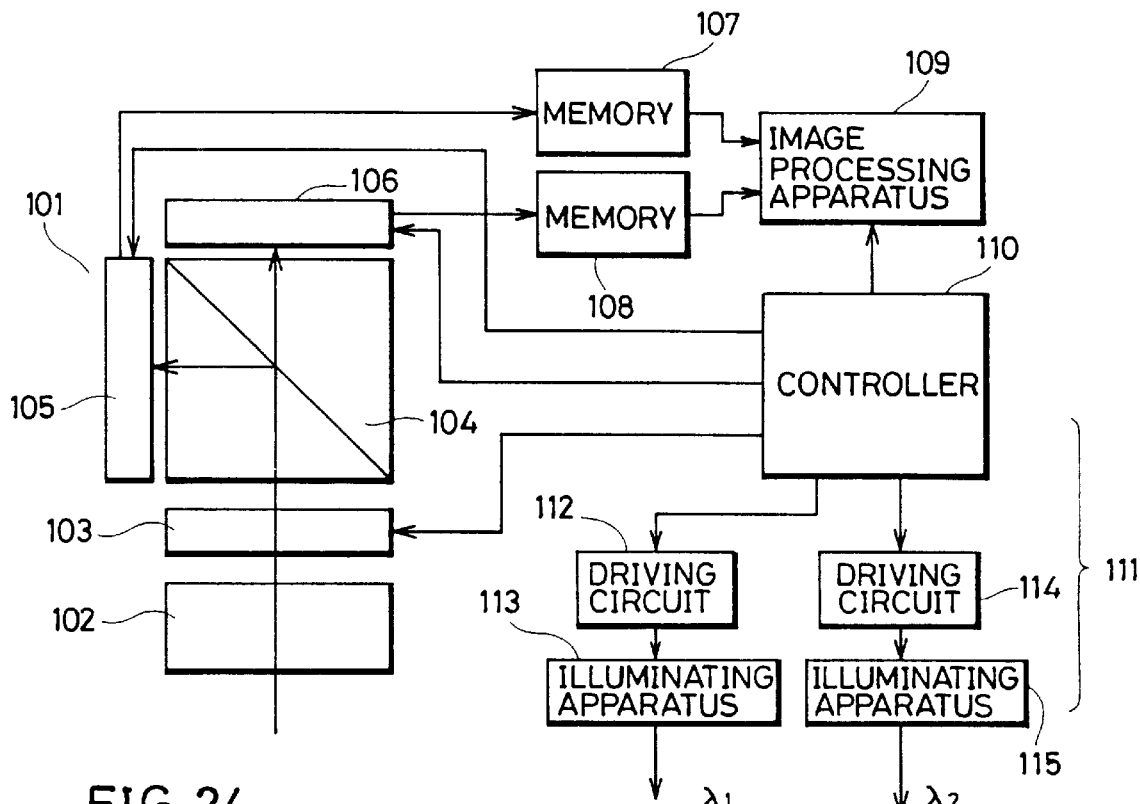
FIG. 23 shows one embodiment of the present invention applied to an electric shutter type image pickup apparatus.

FIG. 23 shows an embodiment in which the present invention is applied to an electric shutter type image pickup apparatus. Referring to FIG. 23, an electric shutter type camera 101 comprises a lens 102, an electric shutter 103, an optical apparatus 104 for separating images corresponding to wavelength, an image pickup element 105 for picking up images having the wavelength $\lambda_1$ and an image pickup element 106 for picking up images having the wavelength $\lambda_2$. The outputs from the image pickup element 105 are applied to a memory 107 while the image pickup outputs from the image pickup element 106 are applied to a memory 108. The memories 107 and 108 respectively store image pick up outputs. An image processing apparatus 109 processes image outputs stored in the memories 107 and 108, respectively, and outputs, for example, the difference therebetween. The electric shutter 103 and the image pickup elements 105 and 106 are controlled by a controller 110, which is formed of, for example, a microcomputer. An illuminating apparatus 111 comprises an illuminating apparatus 113 emitting light having the wavelength $\lambda_1$ and an illuminating apparatus 115 emitting the light having the wavelength $\lambda_2$, which are driven by driving circuits 112 and 114, respectively, under the control of the controller 110.

Figure 24:
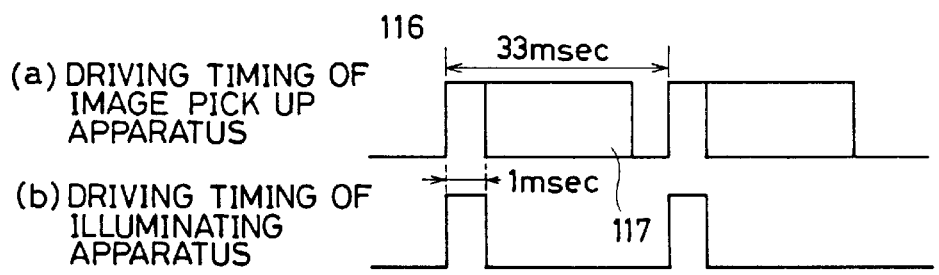
FIGS. 24 and 25 show driving timing of the image pickup apparatus and the illuminating apparatus shown in FIG. 23.
Figure 25:
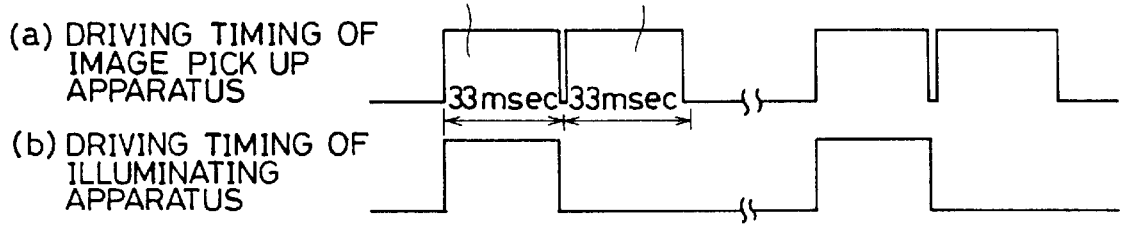

FIGS. 24 and 25 show driving timings of the image pickup apparatus and the illuminating apparatus shown in FIG. 23. The electric shutter type camera 101 shown in FIG. 23 is capable of picking up a moving object with no or little blurring. The concept of the camera is as follows. The electric shutter 103 is opened for a short period of time to expose the image pickup elements 105 and 106. Image signals are temporarily stored in the image pickup element 105 and 106 during a short period of time 116, for example, 1 msec, as shown in FIG. 24(b). Thereafter, at the timing 117 shown in FIG. 24(a), the image signals which are the outputs from the image pickup elements 105 and 106 are transferred to the memories 107 and 108. At the end of the signal transfer, the electric shutter 103 is again opened, the image pickup elements 105 and 106 are exposed, and the operation is repeated. In the electric shutter type camera 101 shown in FIG. 23, image pickup element having high sensitivity must be used as the image pickup elements 105 and 106. The light must be more intense as the shutter speed becomes faster. The employment of the illuminating apparatus 111 in such an apparatus provides the following advantages.

Namely, the light emitting diode can be turned on/off at high speed, larger current can flow therethrough under intermittent driving condition compared with the continuous driving, and therefore the light provided by the diode is more intense. Therefore, at the time of exposure of the image pickup element 105 and 106, sufficient light can be emitted. In this manner, the illuminating apparatus 111 employing light emitting diodes meet the demand of intense illumination at a short time period, which is desired for the electric shutter type camera 101.

The exposure time of one image plane of the image pickup elements 105 and 106 is in the range of about 33 msec to 0.5 msec. When we consider a case in which 30 images are picked up per second with the minimum exposure time of 1 msec or 0.5 msec, the time of illumination is no more than 1/1000, compared with the continuous illumination. In that case, a light emitting diode, which conducts only about 50 mA when it is continuously driven, conducts several A current by intermittent driving. Therefore, illumination required for exposure can be ensured.

In the image pickup apparatus of the present invention, external illumination should be preferably cut off as they cause noises. An effect of the reduction of the exposure time is that the intensity of external illumination becomes relatively low in comparison with the intensity of the illuminating apparatus. Therefore, the reflection component derived from external illumination becomes relatively small, and accordingly the noise component becomes smaller and improve S/N ratio. In addition, since illumination of the necessary intensity is provided only when it is needed, power consumption can be reduced and less heat is generated.

As another example of intermittent driving, a method for removing reflected components derived from external illumination will be described in the following.

FIG. 25 shows timings for driving the illuminating apparatus. In this example, image pickup is carried out time divisionally, with two images considered as a set. The time required for picking up one image plane is 33 msec, for example, which is represented by A1 and A2. At the time of image pickup A1, the illuminating apparatus is on. At the time of image pickup A2, the illuminating apparatus is off. The images picked up at the times A1 and A2 are both illuminated by the external illumination. Provided that the condition of the external illumination is the same at the times of A1 and A2, the image with the illuminating apparatus being on can be extracted by subtracting the image at the time A2 from the image picked at the time A1.

An image processing apparatus in which feature points of an object to be picked up are extracted on real time, that is, 30 images/sec will be described in the following as an application of the present invention. When a movement of a person is to be detected on real time, the method for image pickup which facilitates extraction of feature points must be selected, such as applying marks on the face or the body or providing reference light. However, these selection is not sufficient for the real time detection. The high speed operation of the image processing apparatus is essential. In the present invention, the above described feature points can be easily extracted by the subtracting operation between two images.

Figure 26:
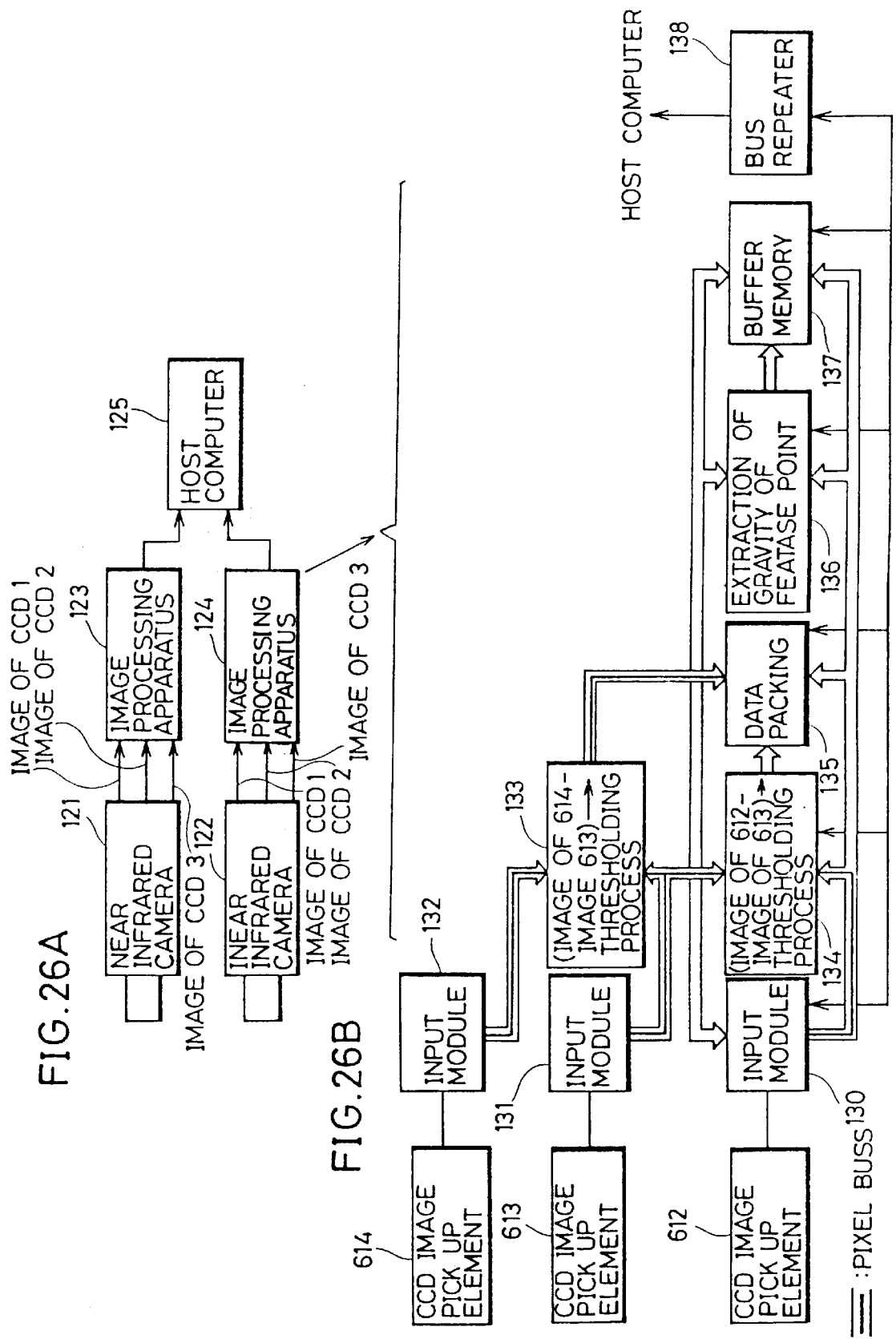
FIG. 26A is a schematic block diagram showing a whole structure of an image processing apparatus detecting on real time feature points by using the image pickup apparatus in accordance with the present invention.
FIG. 26B is a specific block diagram of the image processing apparatus shown in FIG. 26A.

FIG. 26A is a schematic block diagram showing a whole structure of an image processing apparatus in which feature points are detected on real time by employing the image pickup apparatus of the present invention. FIG. 26B is a specific block diagram of the image processing apparatus shown in FIG. 26A.

Referring to FIG. 26A, R, G and B image signals picked up by near infrared cameras 121 and 122 are respectively applied to image processing apparatuses 123 and 124, processed therein and applied to a host computer 125. The image processing apparatuses 123 and 124 are structured as shown in FIG. 26B. Namely, the image processing apparatus 123 is basically consisted of a module 130 in which a timing signal for pipe line processing is formed from inputted signals. Other input modules 131 and 132 and various pipe line processor modules 153, 154, 155 and 156 connected to the module 130 operate in parallel. The near infrared camera 121 comprises CCD image pickup elements 612, 613 and 614, the image signals from which are separately applied to the modules 130, 131 and 132, respectively. The modules 130, 131 and 132 turns image signals into pixel data by A/D conversion in synchronization with the output signals from the CCD image pickup elements 612, 613 and 614, respectively, and the pixel data are successively applied to the pipe line processor modules 133, 134, 135 and 136, through video busses. Each of the pipe line processor modules 133, 134, 135 and 136 has a plurality of inputs. For example, in a subtracting operation between two images, the pipe line processor module 133 carries out subtraction on B-R and thresholding operation. The pipe line processor 134 carries out subtraction B-G and the thresholding process. The pipe line processor 135 takes the image signals processed in the pipe line processors 133 and 134, and the pipe line processor 136 calculates the center of gravity of the extracted feature points.

The calculated barycentric coordinates are transferred through a repeater 138 to the host computer 125 to detect the eye fixation. In this manner, the A/D converted pixel data are processed through a plurality of pipe line processor modules 133 to 136 while one image is taken. The time required for processing one image is the time 33 msec in which the final pixel is taken, plus the delay time in the pipe line processing. The input modules 130, 131 and 132 can start taking of the next image as soon as they transfer the final pixel to the processor. Therefore, in an image processing realized by simple four rules as the object of the present invention (subtracting process between images), the real time processing can be realized at the rate of 33/sec with the delay time of 33 msec+α.

The application of the present invention to an active stereo vision in which a shape pattern illuminates the object to be picked up as the reference light and the three dimensional shape of the object is calculated in accordance with the change in the reflected pattern corresponding to the pattern used for illumination, as another example of the application of the present invention to the field other then eye tracking.

Figure 27:
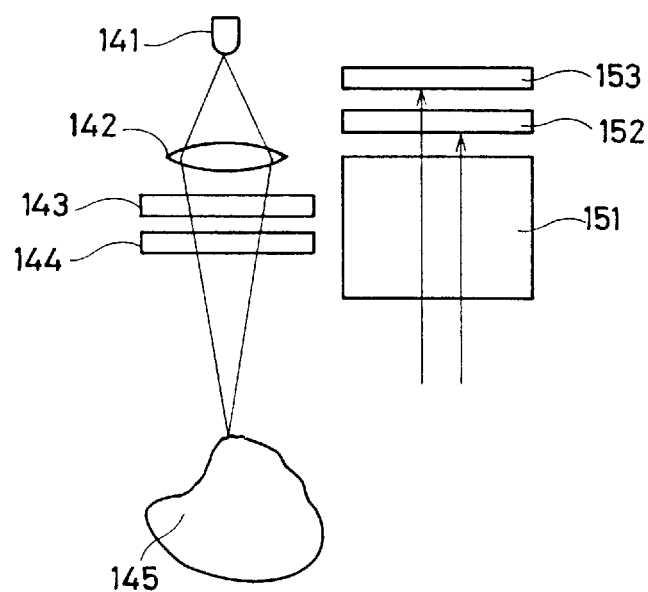
FIGS. 27, 28 and 29 show examples of the present invention applied to active stereo vision measuring method.
Figure 28:
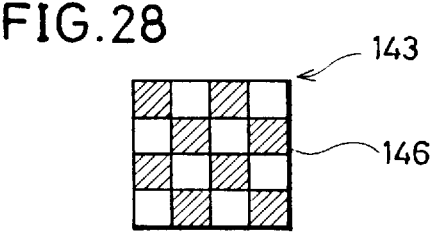
Figure 29:
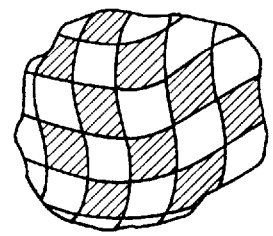

FIGS. 27, 28 and 29 show an example of the application of the present invention to the active stereo vision measurement. Referring to FIG. 27, reference light emitted from an illuminating apparatus 141 employing light emitting diodes as light sources illuminates an object 145 through a lens system 142, a shape pattern 143 and a polarizer 144. The object is, for example, the face of a person. The shape pattern 143 is as shown in FIG. 28, for example, and the reference light from the light source 141 projects the pattern 146 of the shape pattern 143 onto the object 145 by the lens system 142. The light reflected from the object 145 passes through the taking lens 151 and the polarizer 152 so as to form an image on the image pickup element 153. The polarizing surface of the polarizer 152 is rotated by 90° about the polarizing surface of the polarizer 144.

FIG. 29 shows an image of the pattern projected on the object 145 picked up by the image pickup element 153. In general, the object 145 has smooth parts. The reference light is regularly reflected on these portions, so that the regularly reflected images disturbing the projected pattern generally appear in the projected image of FIG. 29 in the prior art without polarization. However, in this method in which the reference light is polarized for illumination and the regularly reflected component is cut off from the reflected light, the noise components derived from the regularly reflected images can be reduced, whereby the shape pattern image reflecting the feature information of the shape of the object can be effectively extracted, as shown in FIG. 28.

The eye tracking apparatus will be described in the following and the eye fixation will be described prior to the detailed description of the apparatus.

Figure 30:
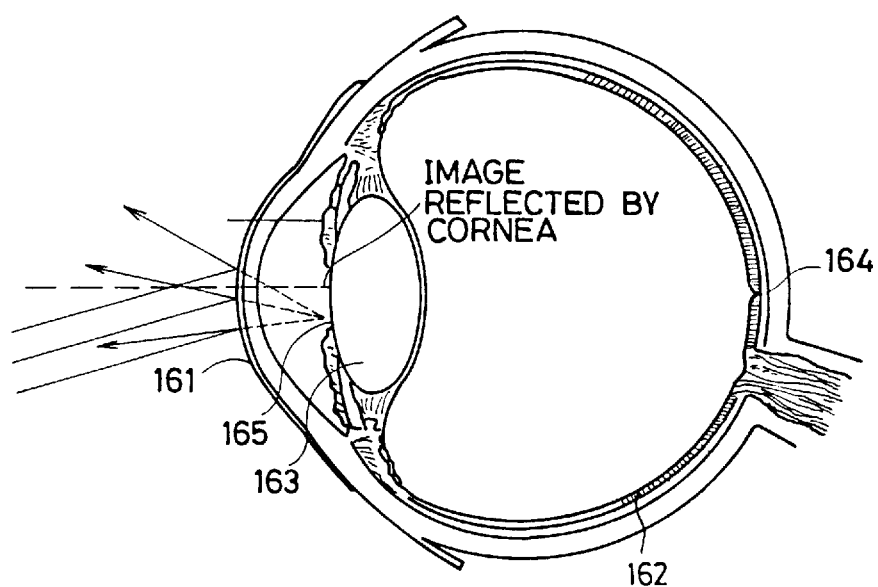
FIG. 30 schematically shows the structure of an eye.

FIG. 30 schematically shows the structure of an eyeball. Referring to FIG. 30, a transparent film covering the front surface of the eye is the cornea 161. The converging of the light to the retina 162 is mostly carried out by the cornea 161. Fine adjustment (adjusting function) for focusing an object is carried out by changing the thickness of a lens 163. A portion called a fovea 164 which has the highest resolution on the retina 162 exists on a point of a line passing through the cornea 161 and the optical axis of the lens 163. When a person watches an object, the eye moves such that the image of the object is formed on the fovea 164. Therefore, we may consider that the visual axis is approximately on the image forming optical axis. The center of the pupil 165 and the rotation center of the eyeball are also in the proximity of the optical axis. Therefore, eye tracking is basically possible by calculating the position of the center of the pupil and the center of the eyeball.

In the following, the algorithm of eye tracking will be described with the visual axis regarded as the line coupling the center of the eyeball and the center of the pupil. The correction for the case where the direction of the visual axis is different from the line in strict sense will be described later.

The stereo vision measurement, in which a world coordinate system is provided on a display screen which the user watches, and the positions of the above described feature points necessary for eye tracking are measured on this coordinate system will be described in the following.

Figure 31:
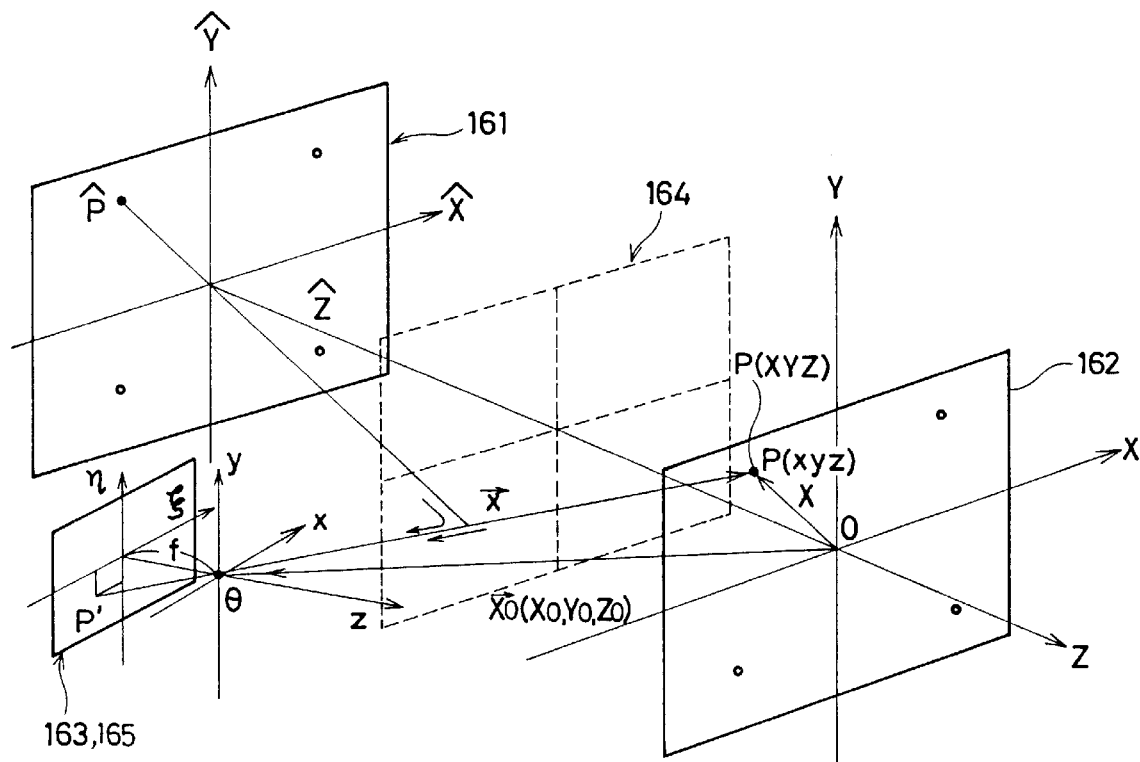
FIG. 31 illustrates the stereo vision measurement.

FIG. 31 illustrates the stereo vision measurement. Referring to FIG. 31, $(\hat{X}, \hat{Y}, \hat{Z})$ represents the world coordinate system 161, which overlaps with the display screen. A mirror 164 is inserted in parallel to the $\hat{X}\hat{Y}$ plane at a prescribed position in the direction of the $\hat{Z}$ axis of the world coordinate system 161 only when the stereo measurement system is to be calibrated. (X, Y, Z) represents the coordinate system which is a projection of the world coordinate system 161 with the $\hat{X}\hat{Y}$ plane thereof projected by the mirror 164.

It is called an object coordinate system 162. (x, y, z) represents a coordinate system 163 of the camera with the origin o being the principal point of the lens. An image pickup surface 165 is positioned spaced apart by the focal length f from the principal point o. The object to be picked up by the camera is the object coordinate system 162, which is the mirror image of the world coordinate system 161. Namely, the object coordinate system 162 faces the display, and the user may be seated near the position thereof in the environment of the interface.

The ultimate object of the present invention is to utilize the movement of the eye in the field of interface, and therefore eye tracking on the display coordinate system is necessary. Accordingly, the feature points of the person must be exactly found on the display coordinate system. In general, when the positions of the feature points taken on the camera coordinate system 163 is to be converted onto a coordinate system different from the camera coordinate system 163, calibration is necessary. In the calibration, a point whose position is known beforehand is prepared on a coordinate system to which the position is to be converted, the point is picked up by the camera, and the parameters for conversion are calculated. Since the measurement should preferably be carried out on the display coordinate system in accordance with the object of the present invention, the calibration is realized basically by displaying a point whose position is definite on the display and by picking up the point by the camera. However, in that case, the camera naturally faces the display and it can not pick up the user facing the display.

Therefore, in the embodiment of the present invention, a mirror 164 is provided in front of the world coordinate system 161 at the time of calibration as shown in FIG. 31 and the virtual image on the mirror is used as the data for calibration. The virtual image is picked up by the camera, and the spatial position of the virtual image is precisely found on the world coordinate system 161. The point $\hat{P}$ on the world coordinate system 161 is reflected by the mirror 161 and appears as the point P on the object coordinate system 162, as shown in FIG. 31. The light is reflected by the mirror 164 as represented by the arrow ① in FIG. 31. Viewed from camera coordinate system 163, the light is measured as coming from the coordinate system 162, as represented by the arrow ②.

The mirror 164 is arranged such that the position and direction thereof are definite in association with the world coordinate system 161. By doing so, the conversion from the world coordinate system 161 to the object coordinate system 162 is facilitated. For example, when the mirror 164 is arranged orthogonally intersecting the Z axis of the world coordinate system 161, the spatial position coordinate on the object coordinate system 162 can be converted into the world coordinate system 161 only by inverting the sign in the direction of the Z axis. If the conversion between the world coordinate system 161 and the object coordinate system 162 is easy, the conversion between the camera coordinate system 163 and the world coordinate system 161, that is, the display coordinate system is enabled by establishing a method of conversion between the camera coordinate system 163 and the object coordinate system 162.

Therefore, in the following description, a method for calculating the spatial position of the feature point P on the object coordinate system 162 based on the data of the two dimensional position of the feature point picked up by the camera in FIG. 31 will be described.

First, the relation between the coordinate (ξ, η) of the image pickup surface of the camera, the camera coordinate (x, y, z) and the object coordinate (X, Y, Z) will be described. As is apparent from FIG. 31, $$\begin{bmatrix} x \\ y \\ z \end{bmatrix} = \begin{bmatrix} -(\xi/f) \cdot z \\ -(\eta/f) \cdot z \\ z \end{bmatrix} \qquad (1)$$

where f is a distance from the principal point of the lens to the image pick up surface (=focal length). Namely, if the coordinate of the image is known on the image pickup surface (known in the measurement), only the direction of the object is definite, and the direction vector of the point P on the camera coordinate system 163 in FIG. 31 is represented as follows:

$$\vec{X} = \vec{oP} = \vec{r} \cdot t \quad \vec{r} = \begin{bmatrix} -(\xi/f) \\ -(\eta/f) \\ 1 \end{bmatrix} \qquad (2)$$

assuming that the coordinate of the point P in the object coordinate system 162 is P(X, Y, Z), then $$\text{vector } \vec{op} = \vec{X} = \begin{bmatrix} X \\ Y \\ Z \end{bmatrix} \qquad (3)$$

when the camera coordinate system 163 is represented as p(x, y, z), then $$\text{vector } \vec{op} = \vec{x} = \begin{bmatrix} x \\ y \\ z \end{bmatrix} \qquad (4)$$

when the coordinate of the point P on the film is represented as p'(ξ, η), then $$\vec{x} = \vec{r} \cdot t = R \cdot (\vec{X} - \vec{X}_0)$$

in accordance with the equation (2). More specifically $$\begin{bmatrix} x \\ y \\ z \end{bmatrix} = \begin{bmatrix} -\xi/f \\ -\eta/f \\ 1 \end{bmatrix} \cdot t = R \cdot \begin{bmatrix} X - X_0 \\ Y - Y_0 \\ Z - Z_0 \end{bmatrix} \qquad (5)$$

t is a parameter according to the equations (2) and (3), the inverse transformation will be represented as $$\vec{X} = R^{-1} \vec{x} + \vec{X}_0$$

$$\therefore \begin{bmatrix} X \\ Y \\ Z \end{bmatrix} = R^{-1} \cdot \begin{bmatrix} -\xi/f \\ -\eta/f \\ 1 \end{bmatrix} \cdot t + \begin{bmatrix} X_0 \\ Y_0 \\ Z_0 \end{bmatrix} \qquad (6)$$

Let us consider a case in which ξ, η, X, Y and Z are given as inputs in the above equation (6) to find position parameters $R^{-1}$, f, $X_0$, $Y_0$ and $Z_0$ as outputs. More specifically, the method for calculating the inclination of the position of the camera and the focal length in the object coordinate system 162 (X, Y, Z) will be described in the following.

N points $P_i$ ($X_i$, $Y_i$, $Z_i$) (i=1 to N) the object coordinates of which are known are picked up and the position coordinates ($\xi_i$, $\eta_i$) (i=1 to N) of the images are measured. By doing so, the position of the camera ($X_0$, $Y_0$, $Z_0$), the rotation angle (α, β, γ) defining the direction of the optical axis of the camera and the inclination of the camera, and the focal length f are determined.

In developing the equation (5), the following equations (7) are provided.

$$-\xi_i/f \cdot t_i = R_{11}(X_i-X_0) + R_{12}(Y_i-Y_0) + R_{13}(Z_i-Z_0)$$

$$-\eta_i/f \cdot t_i = R_{21}(X_i-X_0) + R_{22}(Y_i-Y_0) + R_{23}(Z_i-Z_0)$$

$$t_i = R_{31}(X_i-X_0) + R_{32}(Y_i-Y_0) + R_{33}(Z_i-Z_0)$$

(i=1 to N) \hfill (7)

$R_{ij}$ (i, j=1 to 3) are elements of a rotation matrix, wherein $$R_{11} = \cos\beta \cdot \cos\gamma$$

$$R_{12} = \sin\alpha \cdot \sin\beta \cdot \cos\gamma + \cos\alpha \cdot \sin\gamma$$

$$R_{13} = -\cos\alpha \cdot \sin\beta \cdot \cos\gamma + \sin\alpha \cdot \sin\gamma$$

$$R_{21} = -\cos\beta \cdot \sin\gamma$$

$$R_{22} = -\sin\alpha \cdot \sin\beta \cdot \sin\gamma + \cos\alpha \cdot \cos\gamma$$

$$R_{23} = \cos\alpha \cdot \sin\beta \cdot \sin\gamma + \sin\alpha \cdot \cos\gamma$$

$$R_{31} = -\sin\alpha \cdot \cos\gamma$$

$$R_{33} = -\cos\alpha \cdot \cos\gamma \quad (8)$$

By substituting the third equation for the first and second equation of the above described equations (7) to eliminate the term $t_i$, the following equations (9) are provided.

$$(R_{11}+\xi_i/f \cdot R_{31})(X_i-X_0) + (R_{12}+\xi_i/f \cdot R_{32})(Y_i-Y_0) + (R_{13}+\xi_i/f \cdot R_{33})(Z_i-Z_0) = 0$$

$$(R_{21}+\eta_i/f \cdot R_{31})(X_i-X_0) + (R_{22}+\eta_i/f \cdot R_{32})(Y_i+Y_0) + (R_{23}+\eta_i/f \cdot R_{33})(Z_i-Z_i) = 0$$

(i=1 to N) \hfill (9)

The unknowns which are to be calculated are $(X_0, Y_0, Z_0)$, $(\alpha, \beta, \gamma)$ and f. Therefore, N must be $N \geq 4$. Actually, the most exact value is determined by the method of least squares as will be shown in the solution in the following, and therefore the value N should be relatively large. The solution will be described in the following. Due to the errors in the measurement, the left side of the equation (9) will be not 0 but $\sigma_i$ and $\epsilon_i$. Therefore, the solution can be calculated by miniaturizing the sum of squares of errors ($\sigma_i^2 + \epsilon_i^2$).

In this manner, by picking up a plurality of points the spatial positions of which are known by a camera, the camera coordinate, the direction of the camera and the focal length can be calculated on the object coordinate system 162. Since the object coordinate system 162 can be easily converted into the world coordinate system 161, all the parameters for measurement can be calculated for the world coordinate system 161.

The measurement of the three dimensional position will be described in the following.

Figure 32:
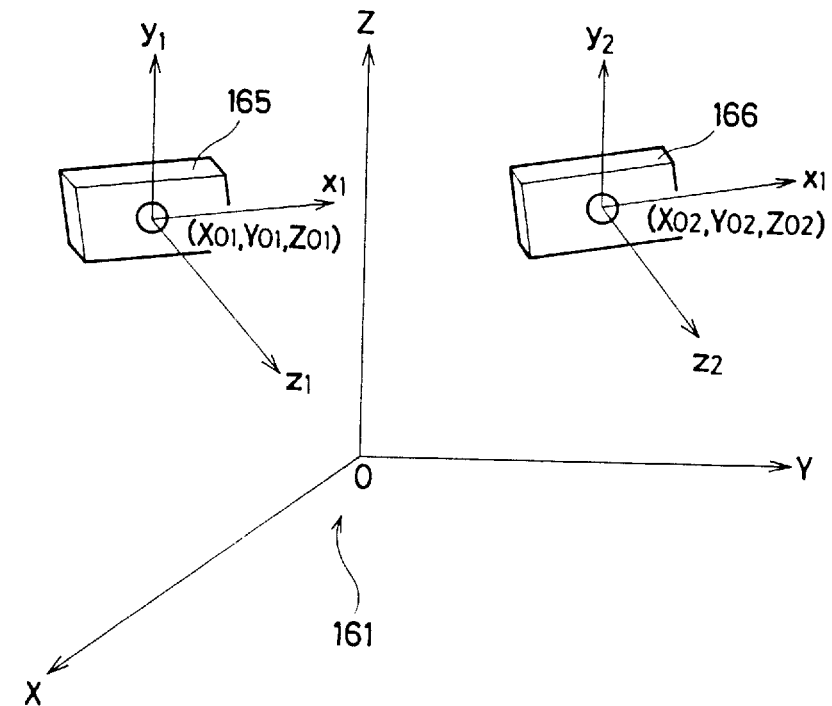
FIGS. 32 and 33 illustrate a method for detecting three dimensional position of an image picked up by two arbitrarily set cameras in association with world coordinate system.
Figure 33:
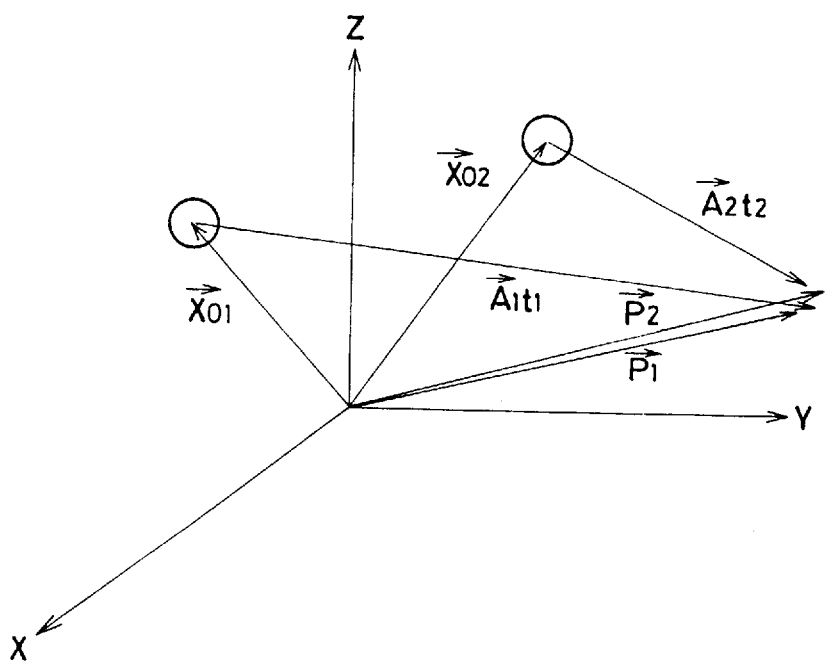

FIG. 32 and 33 illustrate a method for calculating three dimensional position of an image picked up by two cameras arranged arbitrarily in the world coordinate system.

Referring to FIG. 32, the coordinates $(\hat{X}_{0i}, \hat{Y}_{0i}, \hat{Z}_{0i})$ of the principle points of the camera lens, the rotation angles ($\alpha_i$, $\beta_i$, $\gamma_i$) defining the directions of the optical axis and the inclinations of the cameras 165 and 166, and the focal length $f_i$ (i=1 to 2) of the two cameras 165 and 166 in the world coordinate system are known. When a point $P(\hat{X}, \hat{Y}, \hat{Z})$ in the world coordinate system 161 is picked up by the two cameras 165 and 166, the coordinates of the images picked up by these two cameras are respectively represented as ($\xi_1$, $\eta_1$) and ($\xi_2$, $\eta_2$). When we represent the direction vectors from the images ($\xi_i$, $\eta_i$) to the principal points of the lens as $A_1$ and $A_2$, then $$P_1 = A_1 t_1 + X_{01} \quad P_2 = A_2 t_2 + X_{02} \quad (t_1, t_2 \text{ are parameters}) \quad (10)$$

According to the equation (6), $A_1$ and $A_2$ can be represented as $$A_1 = R_1^{-1}\begin{bmatrix} -\xi_1/f_1 \\ -\eta_1/f_1 \\ 1 \end{bmatrix}, A_2 = R_2^{-1}\begin{bmatrix} -\xi_2/f_2 \\ -\eta_2/f_2 \\ 1 \end{bmatrix} \quad (11)$$

the values $A_1$, $A_2$, $X_{01}$, $X_{02}$ are known as they are calculated in the above described calibration. Therefore, the values $P_1$ and $P_2$ can be defined when the values $t_1$ and $t_2$ are calculated. If there is no error, the value $P_1$ is equal to $P_2$, so that the equations (10) can be solved by substituting $P_1 = P_2$. The values $t_1$ and $t_2$ can be calculated by the equations (10). However, since the value $P_1$ is not equal to the value $P_2$ due to the errors in measurement, a closest point is calculated. In this manner, a spatial position of an arbitrary point in the world coordinate system 161 can be measured by using two images.

An eye tracking method using the position and direction of the face and the central positions of the pupil and the dark portion of the eye will be described in the following. The direction of the visual axis can be calculated as a line coupling the coordinate of the center of the eyeball and the coordinate of the pupil. Since the pupil can be directly picked up by the camera, the world coordinate system thereof can be provided in accordance with the algorithm of the stereo vision measurement described above. Although the center of the eyeball cannot be directly measured, it is assumed that the position of the center of the eyeball is fixed in a head coordinate system consisted of three feature points on the face. Therefore, the coordinate of the center of the eyeball given in the head coordinate system is converted into the world coordinate system 161.

Figure 34:
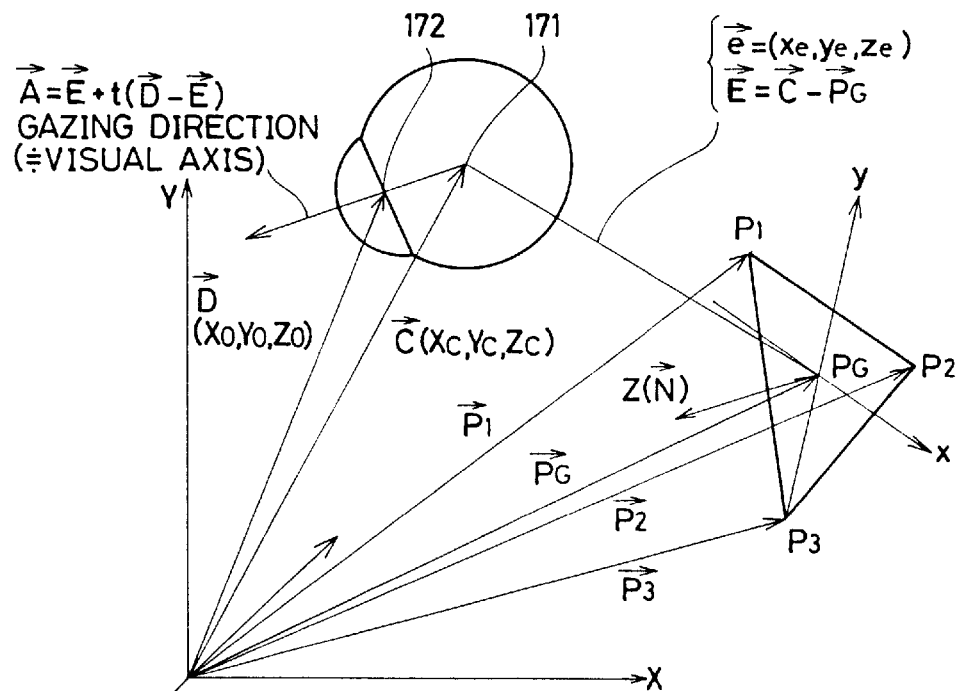
FIG. 34 shows an embodiment of eye tracking.

FIG. 34 shows an embodiment of eye tracking. In the above described stereo vision measurement, the world coordinate system 161 may be regarded as the display coordinate system in FIG. 34. By using this method, the spatial positions of all the feature points which can be directly picked up by the camera can be found in the world coordinate system 161.

Referring to FIG. 34, in the head coordinate system, the origin is at the center $P_G$ of a triangle ($P_1$, $P_2$, $P_3$), and the direction a segment coupling $P_1$ and $P_2$ is regarded as the x axis, a direction orthogonally intersecting the x axis is regarded as the y axis, and the normal direction of the triangle is regarded as the z axis. The reference character e ($x_e$, $y_e$, $x_e$) represents a position vector of the center of the eyeball 171 in the head coordinate system. Although it is unknown at present, this is a constant vector. The position from the center $P_G$ can be measured by some method or another. The vector can be calculated by calibration, as will be described later. Therefore, in the following, it is assumed that the vector is given as an input data.

Therefore, the input data are (1) three feature points $P_i(X_i, Y_i, Z_i)$ (i=1 to 3) and (2) the coordinate $e(x_e, y_e, z_e)$ of the center of the eyeball in the head coordinate system (x, y, z). The output data is the world coordinate value $C(X_c, Y_c, Z_c)$ of the center of the eyeball. When this result is known, the direction of the eye fixation can be calculated as $D(X_D, Y_D, X_D)-C(X_c, Y_c, Z_c)$ in FIG. 34.

The problem in the foregoing is the conversion of the head coordinate system (x, y, z) into the world coordinate system $(\hat{X}, \hat{Y}, \hat{Z})$.

Figure 35:
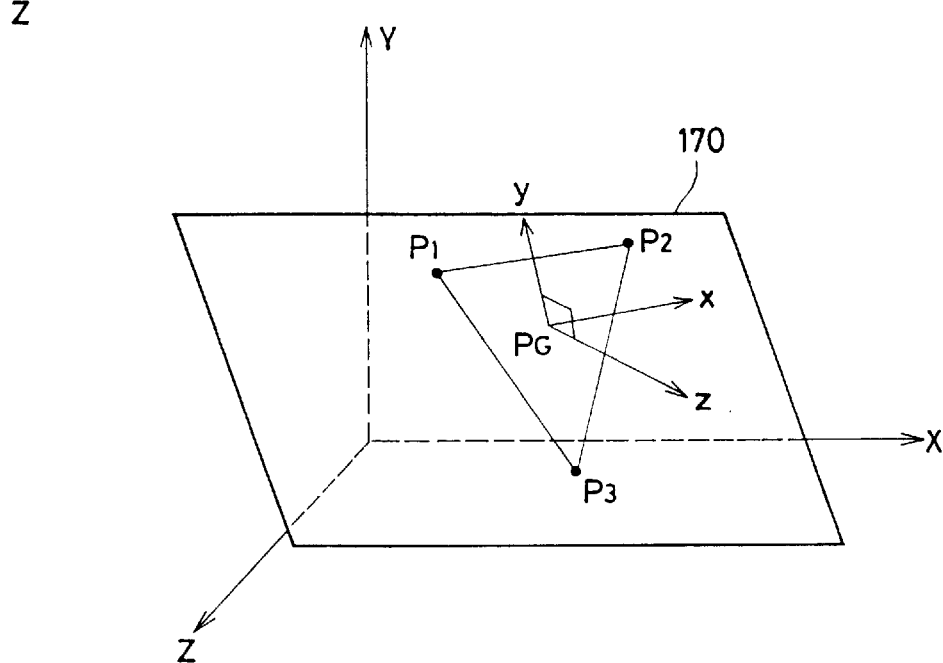
FIG. 35 illustrates coordinate conversion including movement of the origin and the rotation of the coordinate axis.

FIG. 35 illustrates the conversion of the coordinate including movement of the origin and the rotation of the axis of the coordinate. Referring to FIG. 35, the conversion of the coordinate including the movement of the origin and the rotation of the axis of the coordinate is realized in accordance with the following equation (12) in general.

$$\begin{bmatrix} x \\ y \\ z \end{bmatrix} = R \begin{bmatrix} X - X_G \\ Y - Y_G \\ Z - Z_G \end{bmatrix} \quad (12)$$

The inverse transformation is represented by the following equation (13).

$$\begin{bmatrix} X \\ Y \\ Z \end{bmatrix} = R^{-1} \begin{bmatrix} x \\ y \\ z \end{bmatrix} + \begin{bmatrix} X_G \\ Y_G \\ Z_G \end{bmatrix} \quad (13)$$

The value $R^{-1}$ is represented by the following equation (14) assuming that the world coordinate system is rotated by $\beta$ around the Y axis, then rotated by $\alpha$ around the X axis and then by $\gamma$ in the direction of the Z axis so that it corresponds to the head coordinate system.

$$R^{-1} = \begin{bmatrix} \sin\alpha \cdot \sin\beta \cdot \sin\gamma & \sin\alpha \cdot \sin\beta \cdot \cos\gamma & \cos\alpha \cdot \sin\beta \\ +\cos\beta \cdot \cos\gamma & -\cos\beta \cdot \sin\gamma & \\ \cos\alpha \cdot \sin\gamma & \cos\alpha \cdot \cos\gamma & \\ \sin\alpha \cdot \cos\beta \cdot \sin\gamma & \sin\alpha \cdot \cos\beta \cdot \cos\gamma & \cos\alpha \cdot \cos\beta \\ -\sin\beta \cdot \cos\gamma & +\sin\beta \cdot \sin\gamma & \end{bmatrix} \quad (14)$$

Since the value $P_G(X_G, Y_G, Z_G)$ is measured, the values $\sin\alpha$, $\sin\beta$, $\sin\gamma$, $\cos\alpha$, $\cos\beta$ and $\cos\gamma$ are to be calculated. The method for calculating these values will be described in the following.

Figure 36:
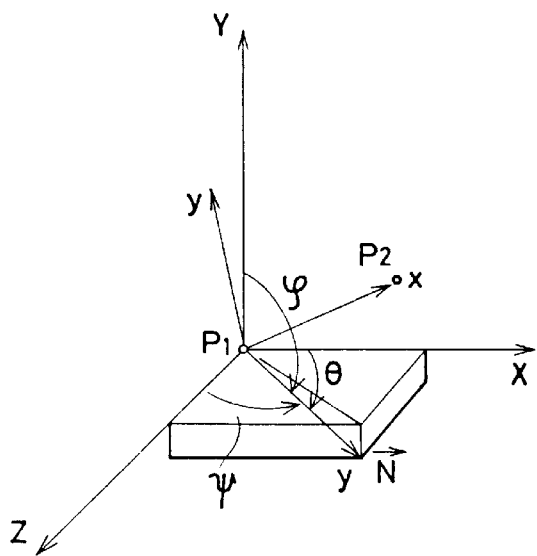
FIG. 36 corresponds to FIG. 34 with the origin of the world coordinate system which is the feature point $P_1$ of the face moved.

FIG. 36 shows the movement of the origin of the world coordinate system which is the feature point $P_1$ of the face shown in FIG. 34. The z direction of the head coordinate system assumed to be equal to the normal vector $\vec{N}$ of the triangle formed by the three points on the face. The direction cosine of the normal vector of the triangle in the world coordinate system can be represented as the following equations (15).

$n_x = \cos\theta$ $n_y = \cos\phi$ $n_z = \cos\phi$ \quad (15)

These values can be calculated in the following manner based on the position coordinates of the three points on the face measured in the world coordinate system. Referring to FIG. 35, the equation of a plane is represented as the following equation (16).

$A \cdot X + B \cdot Y + C \cdot Z + D = 0$ \quad (16)

Since the value X, Y, Z correspond to the three points $P_i(X_i, Y_i, Z_i)$ (i=1 to 3), the following equation is provided.

$$\begin{bmatrix} X & Y & Z & 1 \\ X_1 & Y_1 & Z_1 & 1 \\ X_2 & Y_2 & Z_2 & 1 \\ X_3 & Y_3 & Z_3 & 1 \end{bmatrix} \begin{bmatrix} A \\ B \\ C \\ D \end{bmatrix} = \begin{bmatrix} 0 \\ 0 \\ 0 \\ 0 \end{bmatrix} \quad (17)$$

Since the solution of the equation (17) is other than A=B=C=D=0, the matrix of the coefficient is 0, so that the equation of the plane will be the following equation (18).

$$\begin{vmatrix} X & Y & Z & 1 \\ X_1 & Y_1 & Z_1 & 1 \\ X_2 & Y_2 & Z_2 & 1 \\ X_3 & Y_3 & Z_3 & 1 \end{vmatrix} = 0 \quad (18)$$

More specifically, $$A = \begin{vmatrix} Y_1 & Z_2 & 1 \\ Y_2 & Z_2 & 1 \\ Y_3 & Z_3 & 1 \end{vmatrix} = Y_1(Z_2 - Z_3) - Z_1(Y_2 - Y_3) + (Y_2 Z_3 - Y_3 Z_2) \quad (19)$$

$$B = -\begin{vmatrix} X_1 & Z_1 & 1 \\ Z_2 & Z_2 & 1 \\ X_3 & Z_3 & 1 \end{vmatrix} = -X_1(Z_2 - Z_3) + Z_1(X_2 - X_3) - (X_2 Z_3 - X_3 Z_2) \quad (20)$$

$$C = \begin{vmatrix} X_1 & Y_1 & 1 \\ X_2 & Y_2 & 1 \\ X_3 & Y_3 & 1 \end{vmatrix} = X_1(Y_2 - Y_3) - Y_1(X_2 - X_3) + (X_2 Y_3 - X_3 Y_2) \quad (21)$$

$$D = -\begin{vmatrix} X_1 & Y_1 & Z_1 \\ X_2 & Y_2 & Z_2 \\ X_3 & Y_3 & Z_3 \end{vmatrix} = -X_1(Y_2 Z_3 - Y_3 Z_2) + \quad (22)$$

$Y_1(X_2 Z_3 - X_3 Z_2) - Z_1(X_2 Y_3 - X_3 Y_2)$

Therefore, the normal vector N of the plane 170 will be:

$$N = \begin{bmatrix} n_x \\ n_y \\ n_z \end{bmatrix} = \begin{bmatrix} \cos\theta \\ \cos\Phi \\ \cos\psi \end{bmatrix} = \begin{bmatrix} \dfrac{-AD}{|D|\sqrt{A^2 + B^2 + C^2}} \\ \dfrac{-BD}{|D|\sqrt{A^2 + B^2 + C^2}} \\ \dfrac{-CD}{|D|\sqrt{A^2 + B^2 + C^2}} \end{bmatrix} \quad (23)$$

The direction cosine ($n_x$, $n_y$, $n_z$) of the normal vector of the triangle can be calculated in the similar manner based on the condition that the world coordinate system is rotated by $\beta$ around the Y axis, then rotated by $\alpha$ around the X axis so that the Z axis corresponds to the Z axis of the head coordinate system.

Figure 37:
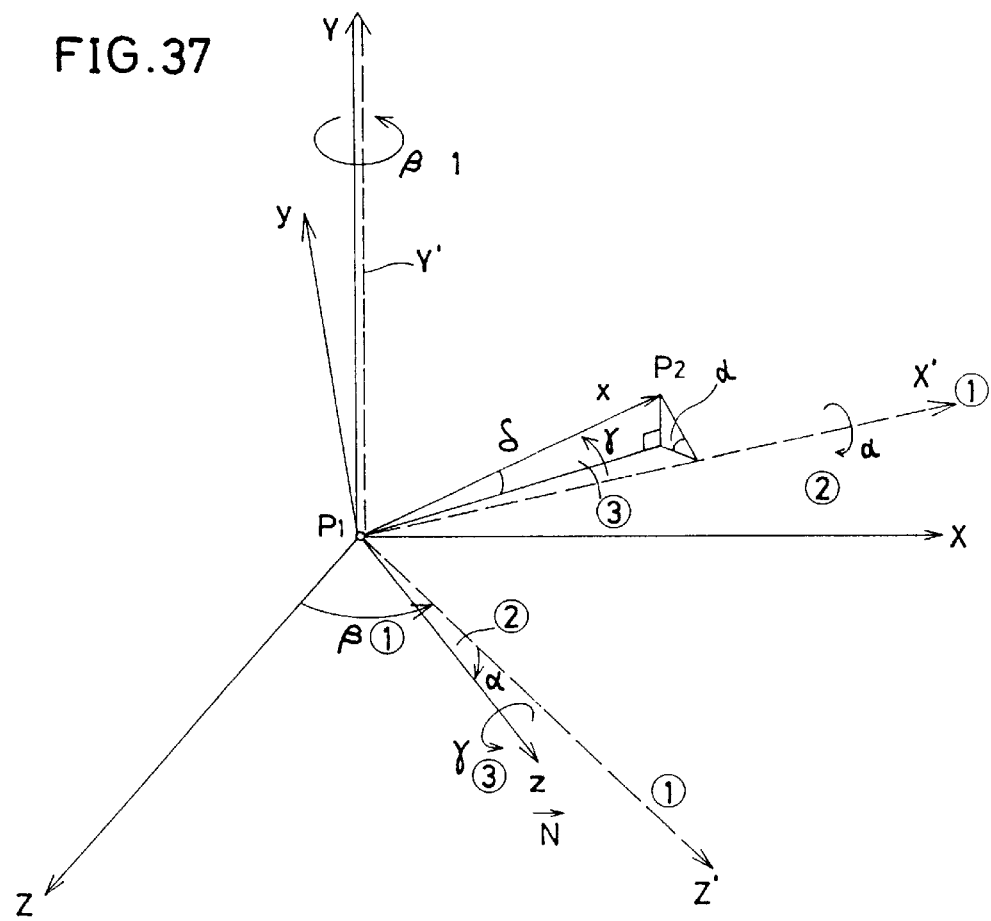
FIG. 37 shows a state of the rotated world coordinate system.

Referring to FIG. 37, the reference numeral (1) represents the rotation of the world coordinate system around the Y axis by $\beta$. At that time, (X, Y, Z) is turned to (X', Y', Z') represented by the dotted lines. The reference numeral (2) indicates the rotation of the world coordinate system around X' by $\alpha$. By this operation, the Z' axis coincides with the z axis. Therefore, from FIG. 37, the direction cosine ($n_x$, $n_y$, $n_z$) is represented as:

$n_x = \cos\alpha \cdot \sin\beta$ $n_y = \sin\alpha$ $n_z = \cos\alpha \cdot \sin\beta$ \quad (24)

In this manner, the direction of the z axis is determined, and one condition for calculating the values $\sin\alpha$, $\sin\beta$, $\sin\gamma$, $\cos\alpha$, $\cos\beta$ and $\cos\gamma$ is provided in accordance with the equations (23) and (24).

Thereafter, referring to FIG. 37, the world coordinate system is rotated by $\gamma$ around z axis (that is, N) of the head coordinate as shown by the reference numeral (3), so that X' axis overlaps with the x axis of the head coordinate system. Namely, both the X and Y axes are in parallel to the head coordinate system.

Assuming that the angle formed by $P_1 P_2$ and XZ plane is $\delta$, the following equation can be applied and will be understood from FIG. 37.

$$\sin\delta \frac{Y_2 - Y_1}{\sqrt{(X_2 - X_1) + (Y_2 - Y_1) + (Z_2 - Z_1)}} \approx \cos\alpha \cdot \sin\gamma \quad (25)$$

When we substitute m for the above equation, the rotation angles $\alpha$, $\beta$ and $\gamma$ are represented by the following equation (26), in accordance with the above described equations (23), (24) and (25).

$$\sin\alpha = -n_y, \cos\alpha = \sqrt{1 - n_y^2} \quad (26)$$

$$\sin\beta = n_z/\sqrt{1 - n_y^2}, \cos\beta = n_x\sqrt{1 - n_y^2}$$

$$\sin\gamma = m/\sqrt{1 - n_y^2}, \cos\gamma = \sqrt{1 - n_y^2} - m^2/\sqrt{1 - n_y^2}$$

The value $R^{-1}$ can be calculated by substituting the values of the above equations (26) for the equation (20). Therefore, in accordance with the equation (21), the point in the head coordinate system can be converted into the world coordinate system. Therefore, the position of the center of the eyeball can be calculated in the world coordinate system.

A method for eye tracking will be described in the following. In the above described FIG. 34, when the value of the center of the eyeball is calculated in the world coordinate system, that is, $C(X_c, Y_c, Z_c)$, the segment coupling the value C with the coordinate $D(X_D, Y_D, Z_D)$ of the pupil corresponds to the visual axis. A vector of an arbitrary point on the visual axis can be represented as:

$$A = C + t \cdot (D - C) \quad (27)$$

Where the character t represent a parameter indicating the distance to the index, which can be calculated by various methods. If the display provided on the world coordinate system is a plane (for example, the YZ plane is the display surface in FIG. 34), the origin and the direction of the visual axis vector (D–C) are calculated, and therefore, the point at which the vector encounters the display can be uniquely calculated on the display coordinate.

Since the directions of the visual axes of the left and right eyes can be independently detected in the present invention, a gazing point not on a plane can be also detected. Namely, a spatial gazing point can be extracted. When we represent the vectors to arbitrary points on the left and right visual axes as A1 and A2, the following equation (28) is provided in accordance with the equation (27).

$$\left.\begin{array}{l} A_1 = C1 + r1 \cdot (D1 - C1) \\ A_2 = C2 + t2 \cdot (D2 - C2) \\ \left[\begin{array}{l} \text{where,} \\ C1, C2\text{: vectors to the centers of the left and right eyes} \\ (D1 - C1), (D2 - C2)\text{: left and right visual axis vector} \\ t1, t2\text{: parameters } (t_1, t_2 > 1) \end{array}\right] \end{array}\right\} \quad (28)$$

The point at which A1 and A2 come closest to each other detected by using t1 and t2 as parameters, that point is the gazing point. In this manner, the gazing point as well as the angle of overlap of the left and right eyes can be simultaneously detected in the present invention.

The estimation of the coordinate of the center of the eyeball will be described in the following. The position of the center of the eyeball is assumed to be fixed in the head coordinate system and therefore it is regarded as an input data in the foregoing. However, it is difficult to precisely detect the coordinate of the center of the eyeball. Therefore, it is estimated in accordance with the following manner.

Now, a subject is made to successively look at M points $L_i(X_i, Y_i, Z_i)$ the coordinates of which are known in the world coordinate system. The world coordinate $D_i(X_{Di}, Y_{Di}, Z_{Di})$ of the pupil at that time and the world coordinates $P_{1i}(X_{1i}, Y_{1i}, Z_{1i})$, $P_{2i}(X_{2i}, Y_{2i}, Z_{2i})$ and $P_{3i}(X_{3i}, Y_{3i}, Z_{3i})$ of the three feature points on the face constituting the head coordinates are measured. By using these measured values, the closest value of the coordinate $e(x_e, Y_e, x_e)$ of the center of the eyeball in the head coordinate system is estimated using the method of least squares.

Figure 38:
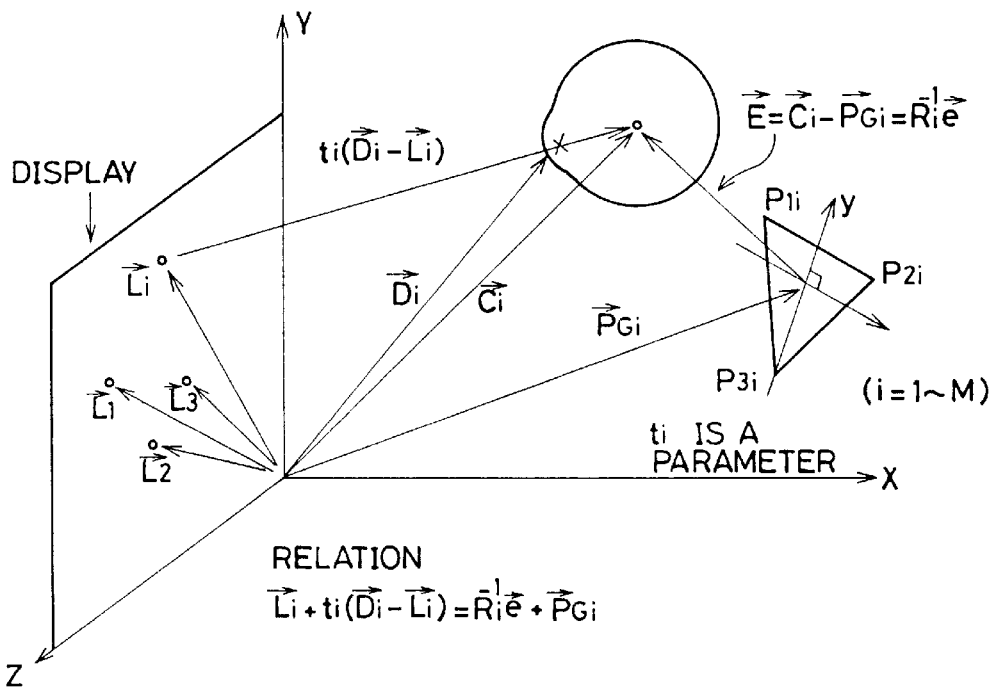
FIG. 38 illustrate vector of the center of the eyeball at the head coordinate system.

Referring to FIG. 38, the vector of the center of the eyeball in the head coordinate system is represented as e, and the vectors of the center of the pupil, the center of the three feature points on the face and the vector of the point $L_i$ when the subject looks at the point $L_i$ are respectively represented as $D_i$, $P_{Gi}$, $L_i$ in the world coordinate system. When the vector e is represented in the world coordinate system, the following equation (29) is applied as is apparent from FIG. 38, since it is $R_i^{-1} \cdot e$.

$$L_i + t_i(D_i - L_i) = R_i^{-1} e + P_{Gi} \text{ (i=1 to M)} \quad (29)$$

$t_i$ is a parameter ($t_i > 1$)

Namely, the following simultaneous equations (30) are provided.

$$\begin{bmatrix} X_i \\ Y_i \\ Z_i \end{bmatrix} + t_i \begin{bmatrix} XD_i - X_i \\ YD_i - Y_i \\ ZD_i - Z_i \end{bmatrix} = \begin{bmatrix} r_{11i} & r_{12i} & r_{13i} \\ r_{21i} & r_{22i} & r_{23i} \\ r_{31i} & r_{32i} & r_{33i} \end{bmatrix} \begin{bmatrix} x_e \\ y_e \\ z_e \end{bmatrix} + \begin{bmatrix} X_{Gi} \\ Y_{Gi} \\ ZGi \end{bmatrix} \quad (30)$$

$$(i = 1 \text{ to } M)$$

Where $r_{11i}, r_{12i} \ldots r_{33i}$ are elements of the rotation matrix $R_i^{-1}$, which are provided by substituting the equation (26) for the equation (20). By eliminating the term $t_i$ from the equation (28) and by arranging the expression for $x_e$, $Y_e$ and $Z_e$, the following equations (31) are provided.

$$U_{1i}x_e + U_{2i}y_e + U_{3i}z_e + U_{0i} = 0$$

$$V_{1i}x_e + V_{2i}y_e + V_{3i}z_e + V_{0i} = 0$$

$$(i=1 \text{ to } N) \quad (31)$$

The values $U_{1i}$, $U_{2i}$, $U_{3i}$, $U_{0i}$, $V_{1i}$, $V_{2i}$, $V_{3i}$ and $V_{0i}$ are provided as measured date. Therefore, the solutions of the unknowns $x_e$, $Y_e$ and $Z_e$ can be calculated by setting $\delta_i$ and $\epsilon_i$ respectively on the right side of the equation (29) and by minimizing the sum of squares of the error $\Sigma(\delta_i^2 + \epsilon_i^2)$.

In the foregoing, the parameter which must be calculated by calibration is only the central position of the eyeball on the head coordinate. Therefore, the number of indexes presented in front of the subject for calibration may be small. Since the calibration can be carried out in a simple manner, the number of errors caused by the difference of the subjects can be reduced, and high precision can be realized. Although the visual axis is regarded as a line coupling the pupil and the center of the eyeball in the foregoing, it does not always coincide with each other in the strict sense.

Figure 39:
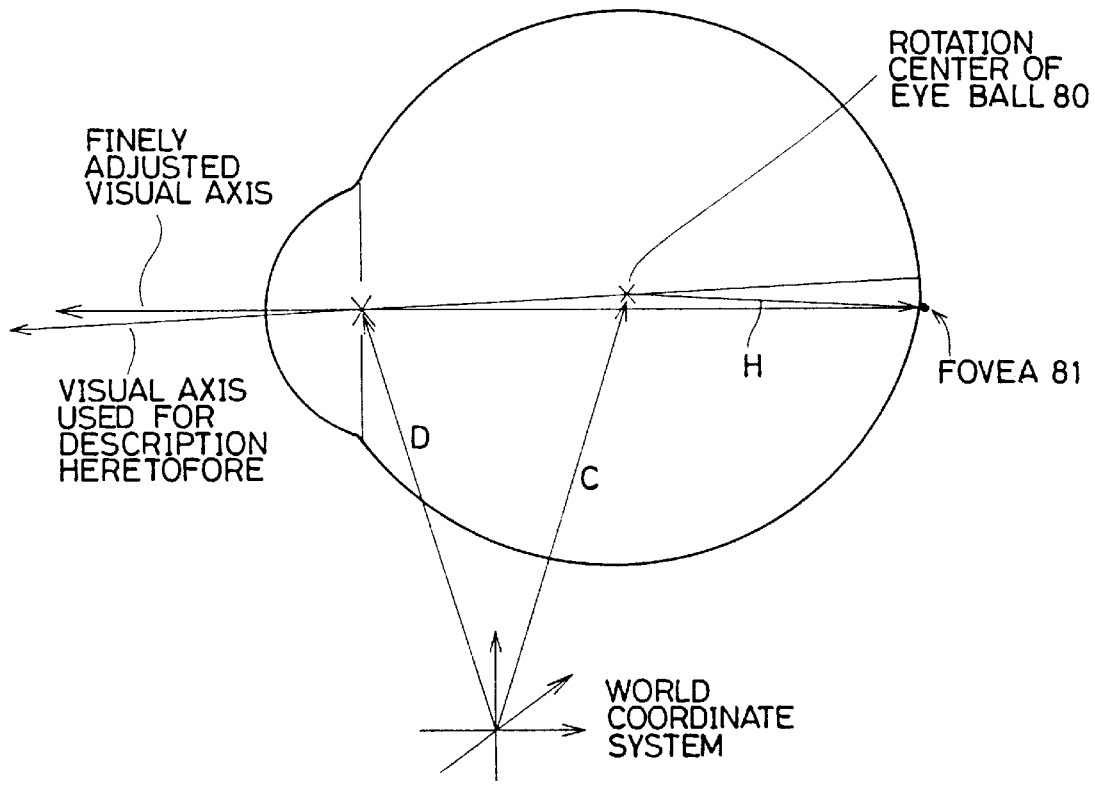
FIG. 39 shows a case in which the center of the eyeball does not exist on a segment coupling the pupil and the fovea.

FIG. 39 shows a case in which the center of the eyeball does not exist on a segment coupling the pupil and the fovea. Referring to FIG. 39, when the center of the eyeball is not on the line coupling the pupil and the fovea, the position of the center of the eyeball is assumed and the vector from the assumed point to the fovea may be calculated by some means or another or the vector may be calculated as a constant vector during calibration. In any case, it is effective to calculate the point of the center of the eyeball which is independent from the rotation of the eyeball and does not move much in detecting eye fixation. The above described problem can be treated in the improvement of the present invention. When the subject wears optical glasses, calibration in consideration of the influence of the glass lenses must be carried out. In that case also, the calibration can be carried out by the improvement of this invention.

The method using the pupil and the images reflected from the cornea employ only the feature points in the eye. Assuming that the positions of the light sources are known and the structure of the eyeball is constant, the images reflected from the cornea is determined uniquely dependent on the position of the center of eyeball and the position of the pupil (corresponding to the rotation of the eyeball). Therefore, the position of the center of the eyeball can be calculated from the images reflected from the cornea and on the position of the pupil by using the parameter of the eyeball structure. The visual axis can be calculated from the center of the eyeball and the position of the pupil. The parameter of the eyeball structure comprises the radius of the eyeball, the radius of curvature of the cornea, and the distance between the center of the eyeball and the center of the curvature of the cornea. These parameters may be measured in advance or they may be calibrated during use with the user looking at a specified portion on the display.

How to select the feature points on the face will be described in the following. Generally, a user facing the display does not change his expression much. Therefore, the skin does not move much. Even if it moves, it soon goes back as it was. Therefore, there are portions which hardly moves on the face which do not prevent eye tracking. More specifically, these portions include the medial angle of eye, the top of the nose, a central point of the upper lip and so on. These points do not move much unless the expression changes much. In addition, the colors of these portions are different from the peripheries, so that the features can be easily extracted by image processing. Namely, the positions of the feature points can be identified by edge extraction and thresholding process. In order to improve precision in eye tracking, it it preferred to pick up portions around the eyes enlarged. Therefore, it is preferred to select the feature points of the face near the eyes. There are many such points around the eyes. When the eye fixation is to be detected at high speed by a simple image processing, marks may be applied on these points.

Figure 40:
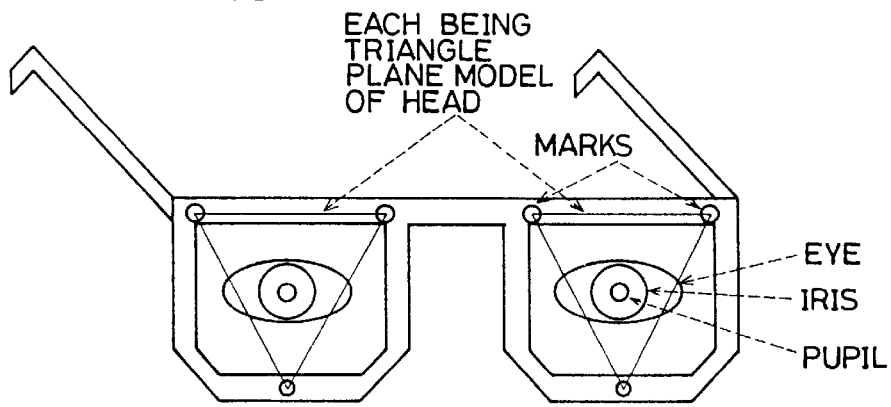
FIG. 40 shows an example of a head model using glasses with marks.

FIG. 40 shows an example of a model of the head employing glasses having marks. If it is difficult to apply marks on the face, marks 172 may be applied on three portions on the frame of the optical glasses as shown in FIG. 40. By wearing these glasses 171, the head can be turned into a model by the marks 172. How to extract these marks 172 will be described later together with the extraction of the pupils. Although three points on the face are used for modeling in the example shown in FIG. 40, four or more points may be used.

Figure 41:
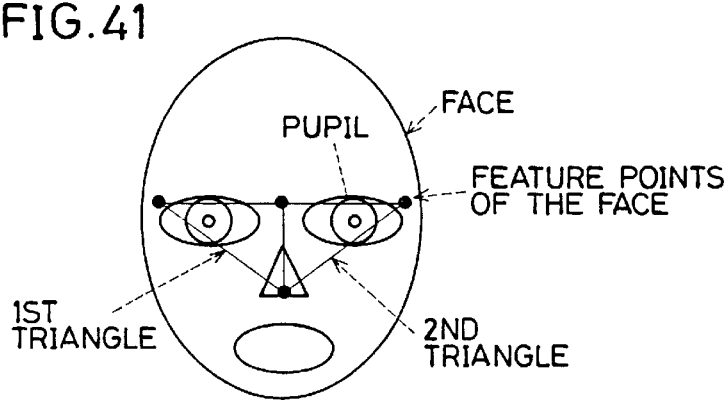
FIG. 41 shows a head turned into a model with four points.

FIG. 41 shows a case in which four points are used for modeling. In this example, the center of the eyeball is calculated by a second triangle 174 instead of a first triangle 173 in case where the first triangle 173 cannot be found as the feature points could not be well extracted. Since the head of a person moves variously, the respective feature points are not always caught by the camera actually. Therefore, in the actual application, a plurality of triangles may be prepared to be switched as needed, in order to continuously tracking the eyes.

There are not many points on the face which do not move much. Sometimes it is difficult to extract such points. Therefore, four or more feature points on the face, actually the more the better, are used and three or more virtual points are again calibrated out of these points so as to turn the head into a model.

Figure 42A:
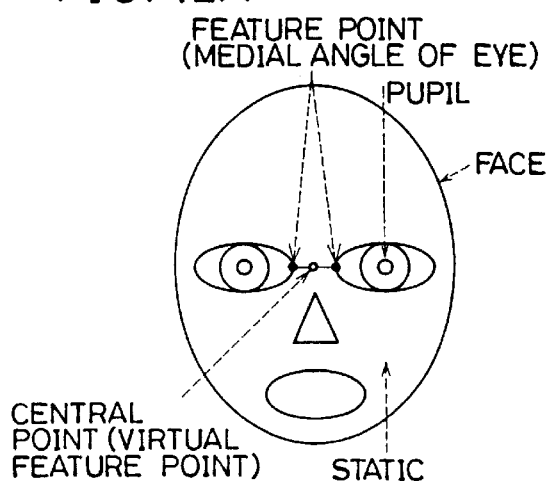
FIGS. 42A and 42B show an example for detecting a static virtual feature point from two feature points.
Figure 42B:
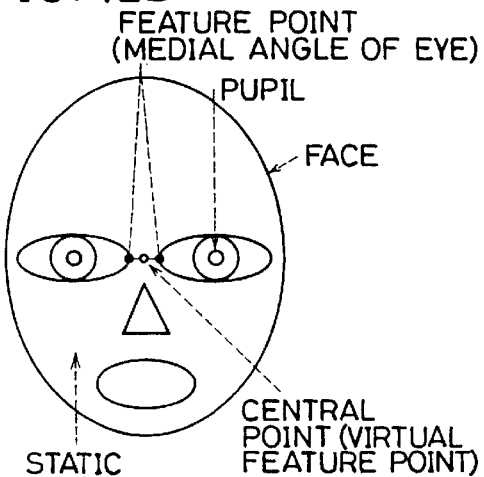
Figure 43:
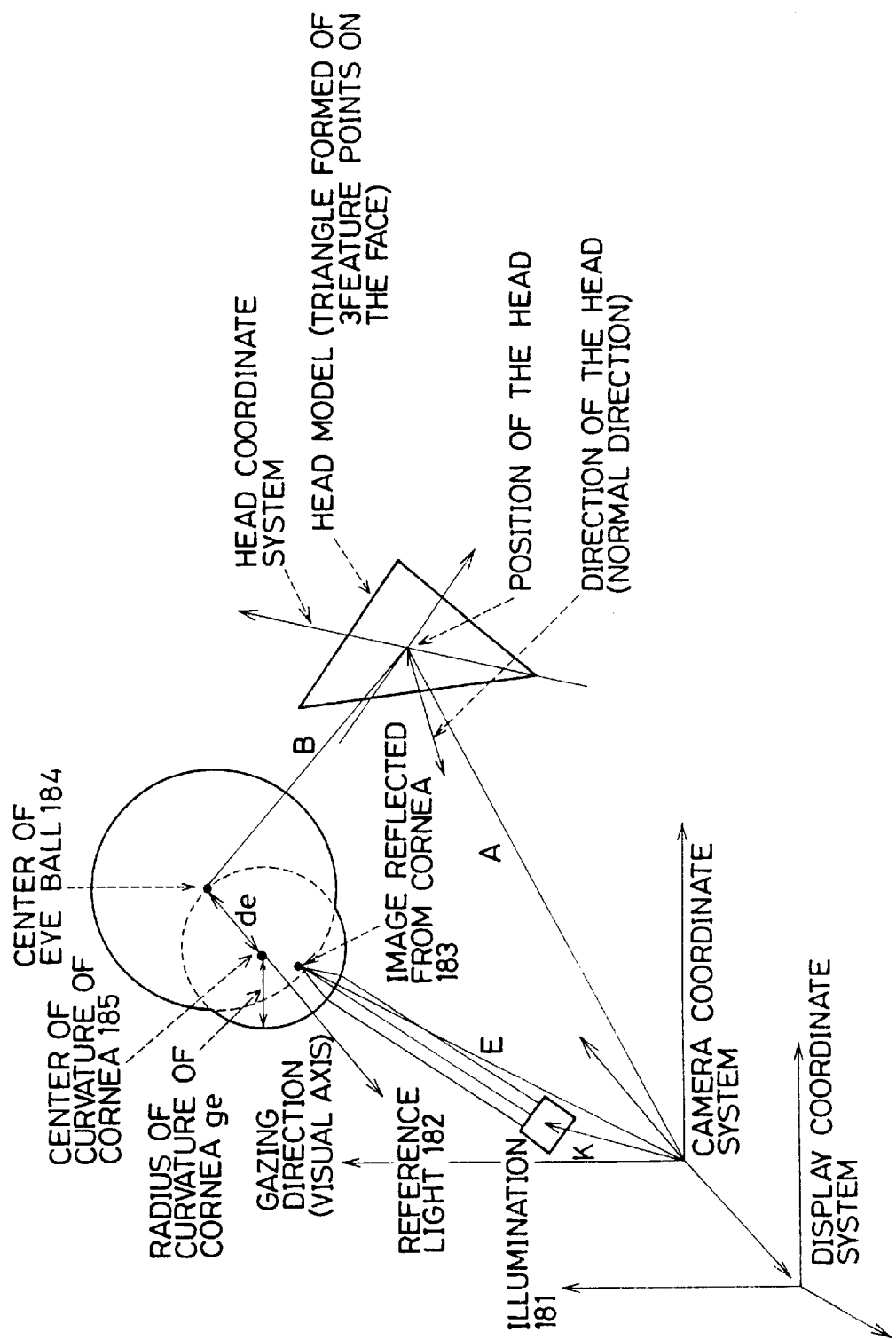
FIG. 43 illustrates another embodiment of eye tracking.

FIGS. 42A and 42B show examples of calculation of a static virtual feature point out of two feature points on the face. The positions of the medial angle of the eye and the lateral angle of the eye change as the person narrows his eyes. However, when the person narrows his both eyes (as one usually does), the position of the center between the two feature points on the lateral angle of the eye hardly changes. The same can be applied on the corners of the nose, eyelashes and so on. Since the skin moves more than the muscles on the face, when a portion extends, another portion shrinks without fail. Therefore, by preparing the expressions and the corresponding movements on the skin as data base, relatively static feature points can be virtually provided. By using such virtual feature points, the precision in eye tracking can be further improved. It is desired to track the movement of the eye as well as the expressions in the future FIG. 43 illustrates another embodiment of eye tracking. Referring to FIG. 43, an illuminating apparatus 181 is provided and a reference light 182 is emitted from the illuminating apparatus 181. Since the cornea can be regarded as a convex lens, virtual image is formed in the cornea when the reference light 182 is approximately parallel, so that it seems as if the light source is on this point. This is called the image 183 reflected from the cornea. The position E of the image 183 reflected from the cornea is uniquely calculated dependent on the position of the center 184 of the eyeball, a point (for example the center 185 of the curvature of the cornea) on the optical axis of the cornea and the radius of curvature ge of the cornea.

The position of the center of the eyeball is A+B here, which can be calculated as described above. Therefore, when the position of the center 185 of the curvature of the cornea is calculated, the eye fixation can be detected. When the distance de between the center of the eyeball and the center of the curvature of the cornea and the radius ge of the curvature of the cornea are known, the position of the center 185 of the curvature of the cornea can be geometrically calculated by using the position of the center 184 of the eyeball and the position E of the image reflected from the cornea. In this manner, the eye fixation can be detected by using the feature points on the face and the image 183 reflected on the cornea. When the values ge and de cannot be actually measured, these may be determined as unknowns through the above described calibration.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In an eye tracking method for detecting eye fixation from an image of a face picked up by an image pickup apparatus, including the steps of detecting a position and a direction of a head from the image of the face picked up by said image pickup apparatus, detecting a pupil of an eye from the image of the face picked up by said image pickup apparatus and calculating eye fixation based on the detected position of the pupil, the improvement wherein said step of detecting the position and direction of a head comprises the steps of establishing a plane defining a facial coordinate system describing a position of the head and a position and a direction of the face;

determining a position of a center of an eyeball on the facial coordinate system as a function of the position and direction of the face;

identifying a vector connecting the center of the eye ball and a center of the pupil; and establishing a visual axis identifying the eye fixation based on a position of the pupil of the eye ball and the vector connecting the center of the eyeball thereto.

2. An improved eye tracking method as recited in claim 1, wherein said step of determining the position of the center of the eye ball comprises detecting three dimensional positions of three points on the face to establish said plane defining said facial coordinate system and adding a constant vector thereto.

3. A method for detecting a point of eye fixation, in a predetermined coordinate system using as inputs an image of a face picked up by an image pickup device, comprising the steps of:

using an image processing method for generating a facial coordinate system by finding from said image of the face a spacial position and direction in said predetermined coordinate system of a head including the face imaged by the image pickup device;

estimating a position in the facial coordinate system of a center of rotation of the eyeball in the facial coordinate system;

determining a spacial position in the predetermined coordinate system of the center of the eyeball by converting the position of the center of rotation of the eyeball represented in said facial coordinate system to said predetermined coordinate system;

using said image processing method for extracting an image of a characteristic feature of the eye from said image of the face for finding an angle of rotation of the eyeball in the predetermined coordinate system; and finding the point of eye fixation from the spacial position of said center of the eyeball and from the angle of rotation of the eyeball.

4. A method according to claim 3, wherein said step of using image processing for extracting the image of the characteristic feature of the eye comprises the step of detecting a position of one of the group consisting of a pupil of the eye, a dark portion of the eye and an image reflected from a cornea of the eye.

5. A method of detecting eye fixation or a point of gazing in a desired coordinate system, comprising the steps of:

describing an object of gazing in the desired coordinate system;

utilizing an image pick up device to pick up an image of a subject's face and to provide input image signals, performing image processing on the input image signals for detecting spatial positions of feature points of said face and a spatial position of a pupil or an iris;

finding position and direction angle of a head portion of the subject from the spatial positions of said feature points of the face for generating a facial coordinate system;

processing the spatial positions of said feature points for setting a constant vector in said facial coordinate system to describe a position of the center of the eyeball;

converting said constant vector to said desired coordinate system; and detecting, in the desired coordinate system, a connecting line connecting an end point of said constant vector and the position of the pupil or the iris;

generating electrical signals representing the connecting line; and outputting electrical signals identifying the line of sight as signals representing a line having a predetermined inclination to the connecting line.

6. The method of detecting eye fixation including a step of image processing according to claim 5, wherein said step of detecting spatial positions of said feature points of the face comprises the step of providing marks facilitating extraction of said spatial positions of said feature points on at least three portions of a frame;

attaching the marked frame to the subject's face prior to picking up said image of the subject's face by the image pickup device.

7. The method of detecting eye fixation including a step of image processing according to claim 5, wherein said step of outputting electrical signals identifying the line of sight comprises outputting electrical signals representing said line of sight as a line having a predetermined inclination relative to said connecting line.

8. The method of detecting eye fixation including a step of image processing according to claim 5, comprising the further step of inputting the outputted electrical signals identifying the line of sight to a man-machine interface for application to an input device thereof responsive to eye fixation.

9. The method of detecting eye fixation according to claim 5, wherein said predetermined inclination is zero, the outputting step comprising outputting electrical signals representing the connecting line as said line of sight.

10. The method of detecting eye fixation according to claim 5, further comprising the steps of:

preparing at least two points having known positions in the desired coordinate system;

measuring positions of the feature points of the face, of the pupil or of the iris when the subject gazes at said point of gazing; and wherein said step of setting a constant vector in said facial coordinate system to describe a position of the center of the eyeball comprises:

a) assuming that the center of the eyeball is on a line coupling said point and the center of said pupil or on a line having a prescribed inclination therefrom; and b) estimating said constant vector based on said assumption; and wherein said outputting step comprises outputting electrical signals representing said line of sight as a line having a predetermined inclination to the connecting line connecting an end point of said estimated constant vector and the position of the pupil or the iris.

11. A non-contact method of determining a point of eye fixation for input to a man-machine interface between a subject and a utilizing device, comprising the steps of:

using an imaging device to form an image of a face and an eye of the subject and to provide image signals representative thereof;

using a programmed computer to perform image processing of the image signals, the computer programmed for performing the steps of:

a) extracting three fixed image points on the subject's face from the image signals;

b) identifying a plane defined by the three fixed points;
c) defining a facial coordinate system including the plane;
d) establishing a position of a center of an eyeball of the user as a fixed displacement from an origin of the facial coordinate system;
e) extracting a position of a center of a pupil of the eyeball from the image signals;
f) defining a vector from the center of the eyeball to the center of the pupil of the eyeball,
g) determining an orientation of a visual axis corresponding to a line of sight in accordance with the vector, and
h) generating output signals identifying the visual axis for input to the man-machine interface.

12. The method recited in claim 11, wherein said step of using an imaging device comprises using at least two imaging devices to form two images of a face and an eye of the subject and to provide image signals representative thereof;

processing the image signals to generate differential signals representing a differential image obtained from said two images to emphasize signals representing a pupil of the eye relative to background noise in the image signals and to permit image extraction to be performed on the image signals; and using the programmed computer to process information from the differential signals for extracting the three fixed image points and for extracting the position of the center of the pupil of the eyeball from the image signals.

* * * * *

UNITED STATES PATENT AND TRADEMARK OFFICE
CERTIFICATE OF CORRECTION

PATENT NO. : 5,818,954
DATED : October 6, 1998
INVENTOR(S) : Akira TOMONO et al

It is certified that error appears in the above-indentified patent and that said Letters Patent is hereby corrected as shown below:

On the title page, under Foreign Application Priority Data, change "Aug. 19, 1988" to --Aug. 3, 1988--

Signed and Sealed this

Twentieth Day of April, 1999

Attest:

Attesting Officer

Q. TODD DICKINSON

Acting Commissioner of Patents and Trademarks